US011220179B2

(12) United States Patent
Koebler et al.

(10) Patent No.: US 11,220,179 B2
(45) Date of Patent: *Jan. 11, 2022

(54) VEHICLE POWER MANAGEMENT SYSTEM DETERMINING ROUTE SEGMENT LENGTH

(71) Applicant: Invently Automotive Inc., Los Altos, CA (US)

(72) Inventors: Martin Koebler, Saal/Donau (DE); Nicole G. Goldstein, Woodside, CA (US); Stephen J. Brown, Malibu, CA (US); Jason H. Harper, Pleasanton, CA (US)

(73) Assignee: Invently Automotive Inc., Los Altos, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/433,810

(22) Filed: Jun. 6, 2019

(65) Prior Publication Data

US 2019/0283601 A1    Sep. 19, 2019

Related U.S. Application Data

(63) Continuation of application No. 15/720,032, filed on Sep. 29, 2017, now Pat. No. 10,919,409, which is a
(Continued)

(51) Int. Cl.
*G01C 21/34* (2006.01)
*G01C 21/00* (2006.01)
(Continued)

(52) U.S. Cl.
CPC ............... *B60K 35/00* (2013.01); *B60L 3/12* (2013.01); *B60L 7/12* (2013.01); *B60L 8/003* (2013.01);
(Continued)

(58) Field of Classification Search
None
See application file for complete search history.

(56) References Cited

U.S. PATENT DOCUMENTS 4,347,496 A   8/1982  Kubalak
4,408,293 A  10/1983  Avins
(Continued)

FOREIGN PATENT DOCUMENTS

DE    19749582 A1    5/1999
DE    10162866 A1    7/2003
(Continued)

OTHER PUBLICATIONS

"Answers.com", pp. 1-7, Answers.com, http://www.answers.com/topic/drag-coefficient-1.
(Continued)

*Primary Examiner* — Adam D Tissot
(74) *Attorney, Agent, or Firm* — David R. Stevens; Stevens Law Group

(57) ABSTRACT

An apparatus comprising an interface, a memory and a processor. The interface may be configured to receive sensor data samples during operation of a vehicle. The memory may be configured to store the sensor data samples over a number of points in time. The processor may be configured to analyze the sensor data samples stored in the memory to detect a pattern. The processor may be configured to manage an application of brakes of the vehicle in response to the pattern.

9 Claims, 15 Drawing Sheets

Related U.S. Application Data continuation of application No. 15/626,676, filed on Jun. 19, 2017, now Pat. No. 11,065,977, which is a continuation of application No. 14/566,848, filed on Dec. 11, 2014, now Pat. No. 9,682,624, which is a continuation of application No. 14/206,138, filed on Mar. 12, 2014, now Pat. No. 8,972,162, which is a continuation of application No. 13/066,189, filed on Apr. 8, 2011, now Pat. No. 8,712,650, which is a continuation-in-part of application No. 11/283,137, filed on Nov. 17, 2005, now Pat. No. 7,925,426.

(51) Int. Cl.

| | | |
|---|---|---|
| *G06F 17/00* | (2019.01) | |
| *B60K 6/00* | (2006.01) | |
| *B60K 35/00* | (2006.01) | |
| *B60L 58/12* | (2019.01) | |
| *B60L 15/20* | (2006.01) | |
| *B60L 50/62* | (2019.01) | |
| *G06F 7/00* | (2006.01) | |
| *B60L 8/00* | (2006.01) | |
| *B60L 7/12* | (2006.01) | |
| *B60L 3/12* | (2006.01) | |
| *G08G 1/0968* | (2006.01) | |
| *G08G 1/0967* | (2006.01) | |
| *G07C 5/08* | (2006.01) | |
| *G01C 21/36* | (2006.01) | |
| *B60W 50/00* | (2006.01) | |
| *B60W 30/14* | (2006.01) | |
| *B60W 10/11* | (2012.01) | |
| *B60W 10/06* | (2006.01) | |
| *B60T 13/58* | (2006.01) | |
| *B60T 7/22* | (2006.01) | |
| *B60T 7/18* | (2006.01) | |
| *B60T 1/10* | (2006.01) | |
| *B60L 58/16* | (2019.01) | |
| *G07C 5/00* | (2006.01) | |

(52) U.S. Cl.
CPC ............ *B60L 15/2045* (2013.01); *B60L 50/62* (2019.02); *B60L 58/12* (2019.02); *B60L 58/16* (2019.02); *B60T 1/10* (2013.01); *B60T 7/18* (2013.01); *B60T 7/22* (2013.01); *B60T 13/586* (2013.01); *B60W 10/06* (2013.01); *B60W 10/11* (2013.01); *B60W 30/143* (2013.01); *B60W 50/0097* (2013.01); *G01C 21/3469* (2013.01); *G01C 21/3617* (2013.01); *G06F 7/00* (2013.01); *G07C 5/085* (2013.01); *G08G 1/096775* (2013.01); *G08G 1/096844* (2013.01); *B60K 2370/15* (2019.05); *B60K 2370/174* (2019.05); *B60L 2220/44* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/545* (2013.01); *B60L 2240/547* (2013.01); *B60L 2240/549* (2013.01); *B60L 2240/622* (2013.01); *B60L 2240/642* (2013.01); *B60L 2240/645* (2013.01); *B60L 2240/647* (2013.01); *B60L 2240/662* (2013.01); *B60L 2240/665* (2013.01); *B60L 2240/667* (2013.01); *B60L 2240/68* (2013.01); *B60L 2250/10* (2013.01); *B60L 2250/16* (2013.01); *B60L 2260/28* (2013.01); *B60L 2260/50* (2013.01); *B60T 2201/04* (2013.01); *B60T 2210/36* (2013.01); *B60W 2552/20* (2020.02); *B60W 2556/10* (2020.02); *B60W 2556/50* (2020.02); *G07C 5/008* (2013.01); *Y02T 10/40* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/16* (2013.01)

(56) References Cited

U.S. PATENT DOCUMENTS

| | | |
|---|---|---|
| 4,459,671 A | 7/1984 | Teass |
| 5,315,977 A | 5/1994 | Fosseen |
| 5,396,426 A | 3/1995 | Hibino |
| 5,487,002 A | 1/1996 | Diller |
| 5,627,752 A | 5/1997 | Buck |
| 5,650,931 A | 7/1997 | Nii |
| 5,842,142 A | 11/1998 | Murray |
| 5,913,917 A | 6/1999 | Murphy |
| 5,929,609 A | 7/1999 | Joy |
| 5,999,864 A | 12/1999 | Thiel |
| 6,061,625 A | 5/2000 | Fastenrath |
| 6,064,937 A | 5/2000 | Yang |
| 6,070,118 A | 5/2000 | Ohta |
| 6,116,363 A | 9/2000 | Frank |
| 6,135,918 A | 10/2000 | Bellinger |
| 6,163,690 A | 12/2000 | Lilja |
| 6,199,001 B1 | 3/2001 | Ohta |
| 6,206,123 B1 | 3/2001 | Kim |
| 6,233,515 B1 | 5/2001 | Engelman |
| 6,266,588 B1 | 7/2001 | Mcclellan |
| 6,266,610 B1 | 7/2001 | Schultz |
| 6,278,915 B1 | 8/2001 | Deguchi |
| 6,307,277 B1 | 10/2001 | Tamai |
| 6,314,347 B1 | 11/2001 | Kuroda |
| 6,370,472 B1 | 4/2002 | Fosseen |
| 6,374,173 B1 | 4/2002 | Ehlbeck |
| 6,393,573 B1 | 5/2002 | Gillespie |
| 6,401,024 B1 | 6/2002 | Tange |
| 6,415,217 B1 | 7/2002 | Higashimata |
| 6,427,107 B1 | 7/2002 | Chiu |
| 6,436,005 B1 | 8/2002 | Bellinger |
| 6,465,908 B1 | 10/2002 | Karuppana |
| 6,470,240 B1 | 10/2002 | Haynes |
| 6,484,086 B2 | 11/2002 | Jeon |
| 6,487,477 B1 | 11/2002 | Woestman |
| 6,522,955 B1 | 2/2003 | Colborn |
| 6,629,034 B1* | 9/2003 | Kozak ............... G01C 21/3484 340/994 |
| 6,636,787 B2 | 10/2003 | Yamaguchi |
| 6,662,642 B2 | 12/2003 | Breed |
| 6,687,581 B2 | 2/2004 | Deguchi |
| 6,687,595 B2 | 2/2004 | Seto |
| 6,701,897 B2 | 3/2004 | Chatfield |
| 6,794,848 B2 | 9/2004 | Shinada |
| 6,809,429 B1 | 10/2004 | Frank |
| 6,814,170 B2 | 11/2004 | Abe |
| 6,838,858 B2 | 1/2005 | Berneis |
| 6,843,337 B2 | 1/2005 | Matsubara |
| 6,847,189 B2 | 1/2005 | Frank |
| 6,877,488 B2 | 4/2005 | Washeleski |
| 6,895,320 B2 | 5/2005 | Bauer |
| 6,928,344 B2 | 8/2005 | Mcwalter |
| 6,931,309 B2 | 8/2005 | Phelan |
| 6,949,897 B2 | 9/2005 | Wakashiro |
| 7,013,205 B1 | 3/2006 | Hafner |
| 7,099,770 B2 | 8/2006 | Naden |
| 7,102,496 B1 | 9/2006 | Ernst, Jr. |
| 7,124,027 B1 | 10/2006 | Ernst, Jr. |
| 7,167,787 B2* | 1/2007 | Bastian ................ B60W 40/02 701/93 |
| 7,177,750 B2 | 2/2007 | Schröder |
| 7,222,004 B2 | 5/2007 | Anderson |
| 7,233,861 B2 | 6/2007 | Van Buer |
| 7,243,246 B2 | 7/2007 | Allen |
| 7,283,838 B2 | 10/2007 | Lu |
| 7,289,039 B2 | 10/2007 | Kato |
| 7,317,973 B2 | 1/2008 | Dieterle |

(56) References Cited

U.S. PATENT DOCUMENTS

| | | |
|---|---|---|
| 7,321,354 B1 | 1/2008 | Jacobsen |
| 7,337,055 B2 | 2/2008 | Matsumoto |
| 7,346,449 B2 | 3/2008 | Sato |
| 7,360,615 B2 | 4/2008 | Salman |
| 7,367,414 B2 | 5/2008 | Iida |
| 7,369,938 B2 | 5/2008 | Scholl |
| 7,386,389 B2 | 6/2008 | Stolle |
| 7,433,889 B1 | 10/2008 | Barton |
| 7,454,291 B2 | 11/2008 | Kawakami |
| 7,479,897 B2 | 1/2009 | Gertsch |
| 7,497,201 B2 | 3/2009 | Hollenbeck |
| 7,509,193 B2 | 3/2009 | Kustosch |
| 7,512,477 B2 | 3/2009 | Quigley |
| 7,647,153 B2 | 1/2010 | Sugano |
| 7,665,559 B2 | 2/2010 | De La Torre-Bueno |
| 7,715,958 B2 | 5/2010 | Kumar |
| 7,747,365 B1 | 6/2010 | Lowrey |
| 7,751,973 B2 | 7/2010 | Ibrahim |
| 7,812,555 B2 | 10/2010 | Adra |
| 7,822,538 B2 | 10/2010 | Hovestadt |
| 7,873,471 B2 | 1/2011 | Gieseke |
| 7,899,584 B2 | 3/2011 | Schricker |
| 8,069,940 B2 | 12/2011 | Nenno |
| 8,135,531 B2 | 3/2012 | Zhao |
| 8,290,665 B2 | 10/2012 | Placke |
| 8,924,049 B2 | 12/2014 | Kumar |
| 9,619,203 B2 | 4/2017 | Tamir |
| 2002/0072838 A1 | 6/2002 | Mcclellan |
| 2002/0120390 A1 | 8/2002 | Bullock |
| 2002/0134602 A1 | 9/2002 | Kobayashi |
| 2002/0195288 A1 | 12/2002 | Komiyama |
| 2003/0006914 A1 | 1/2003 | Todoriki |
| 2003/0015358 A1 | 1/2003 | Abe |
| 2003/0015874 A1 | 1/2003 | Abe |
| 2003/0033069 A1 | 2/2003 | Bauer |
| 2004/0074682 A1 | 4/2004 | Fussey |
| 2004/0084237 A1 | 5/2004 | Petrie, Jr. |
| 2004/0133336 A1 | 7/2004 | Fosseen |
| 2004/0193420 A1 | 9/2004 | Kennewick |
| 2004/0230376 A1 | 11/2004 | Ichikawa |
| 2005/0021225 A1* | 1/2005 | Kantarjiev ......... G01C 21/3691 701/527 |
| 2005/0052290 A1 | 3/2005 | Naden |
| 2005/0228553 A1* | 10/2005 | Tryon ................ B60L 58/40 701/22 |
| 2005/0233185 A1 | 10/2005 | Dunn |
| 2006/0005736 A1 | 1/2006 | Kumar |
| 2006/0009890 A1 | 1/2006 | Meister |
| 2006/0029296 A1 | 2/2006 | King |
| 2006/0052917 A1 | 3/2006 | Schwarzhaupt |
| 2006/0095195 A1 | 5/2006 | Nishimura |
| 2007/0112475 A1 | 5/2007 | Koebler |
| 2008/0021628 A1 | 1/2008 | Tryon |
| 2008/0027639 A1 | 1/2008 | Tryon |
| 2008/0033624 A1 | 2/2008 | Gronau |
| 2009/0132113 A1 | 5/2009 | Kumar |
| 2016/0009304 A1 | 1/2016 | Kumar |

FOREIGN PATENT DOCUMENTS

| | | |
|---|---|---|
| DE | 102006009710 | 6/2007 |
| EP | 1130415 | 2/2005 |
| JP | 2004012250 | 1/2004 |
| JP | 2007155695 | 6/2007 |
| JP | 4543480 | 9/2010 |
| TW | 200722778 | 6/2007 |
| WO | 2000075682 | 12/2000 |
| WO | 2005115787 | 12/2005 |
| WO | 2008053789 | 5/2008 |

OTHER PUBLICATIONS

"Cell Specification Data", pp. 1-2, Kokam Co., Ltd., http://www.kokam.com/product/product-pdf/high-power/PL-301-SLPB60460330H-70ah-Grade.pdf.

Cassidy et al., "GM Sunraycer Case History/M101 lecture 4-1", Dec. 1, 1990, pp. 1-61, Society for Automotive Engineers, Inc., Warrendale, USA.

Gong et al., Computationally efficient optimal power management for plug-in hybrid electric vehicles based on spatial-domain two-scale dynamic programming; Vehicular Electronics and Safety, 2008, ICVES 2008, IEEE International Conference on; Digital Object Identifier: 10.1109/ICVES.2008.4640882; Publication Year: 2008.

Gong et al., Trip Based Power Management of Plug-In Hybrid Electric Vehicle with Two-Scale Dynamic Programming; Vehicle Power and Propulsion Conference, 2007. VPPC 2007. IEEE: Digital Object Identifier: 10.1109/VPPC.2007.4544089; Publication Year: 2007, pp. 12-19.

Hibbs, "GM Sunraycer History/M101 lecture 2-2", Dec. 1, 1990, pp. 1-37, Society for Automotive Engineers, Inc., Warrendale, USA.

Janach, Ultralight electric vehicle for mass transportation; Vehicle Power and Propulsion Conference, 2008. VPPC '08. IEEE; Digital Object Identifier: 10.1109/VPPC.2008.4677405; Publication Year: 2008, pp. 1-4.

Johannesson et al., Assessing the Potential of Predictive Control for Hybrid Vehicle Powertrains Using Stochastic Dynamic Programming, Intelligent Transportation Systems, IEEE Transactions on vol. 8, Issue: 1; Digital Object Identifier: 10.1109/TITS.2006.884887; Publication Year: 2007, pp. 71-83.

Kim et al., An adaptive address power saving method based on the prediction of power consumption in and AC PDP., Industrial Electronics, IEEE Transaction on, vol. 56, Issue 12, Dec. 2009 pp. 4949-4948; Digital Object Identifier 10.1109/TIE.2009.2026373.

Lovins, et al., "Winning the Oil Endgame", Mar. 1, 2005, p. 50, Rocky Mountain Institute, Snowmass. USA.

Ngo et al., An optimal control-based algorithm for Hybrid Electric Vehicle using preview route information; A.F.A.; American Control Conference (ACC), 2010; Publication Year: 2010, pp. 5813-5823.

Roche et al., "The Speed of Light, The 1996 World Solar Challenge", 1997, pp. 43-46 & 189-194, UNSW.

Shafiullah et al., Reduction of power consumption in sensor network applications using machine learning techniques: TENCON 2008-2008 IEEE Region 10 Conference; Digital Object Identifier: 10.1109/TENCON.2008.4766574; Publication Year: 2008, pp. 1-6.

Xue et al., Traffic-Known Urban Vehicular Route Prediction Based on Partial Mobility Patterns; Parallel and Distributed Systems (ICPADS), 2009 15th International Conference on; Digital Object Identifier: 10.1109/ICPADS.2009.129; Publication Year: 2009, pp. 369-375.

* cited by examiner

| FIG. 4A |
|---|
| FIG. 4B |

VEHICLE POWER MANAGEMENT SYSTEM DETERMINING ROUTE SEGMENT LENGTH

This application relates to U.S. Ser. No. 15/720,032, filed Sep. 29, 2017, which relates to U.S. Ser. No. 15/626,676, filed Jun. 19, 2017, which relates to U.S. Ser. No. 14/566,848, filed Dec. 11, 2014, now U.S. Pat. No. 9,682,624, which relates to U.S. Ser. No. 14/206,138, filed Mar. 12, 2014, now U.S. Pat. No. 8,972,162, which relates to U.S. Ser. No. 13/066,189, filed Apr. 8, 2011, now U.S. Pat. No. 8,712,650, which relates to U.S. Ser. No. 11/283,137, filed Nov. 17, 2005, now U.S. Pat. No. 7,925,426, which are each incorporated by reference in their entirety.

FIELD OF THE INVENTION

The invention relates to devices, methods and systems for controlling power applied to a vehicle engine.

BACKGROUND OF THE INVENTION

Currently, drivers of automotive vehicles have only very imprecise methods for managing the fuel consumption of their cars. For example, drivers can slow down, they can brake lightly, and they can carry lighter loads. Generally, however, fuel consumption cannot be precisely controlled by the driver. More accurate and precise control of fuel consumption is one of the best ways to improve the energy efficiency of most cars. In particular, accurate control of fuel consumption may optimize the energy efficiency of a car.

It has been shown that you can reduce fuel usage by efficient driving. According to Amory Lovins of the Rocky Mountain Institute, a 35% improvement in miles per gallon (mpg) for all 2001 vehicles (whose overall average mpg was 20) would have reduced oil use in the United States by 2.7 Mbbl/d, approximately the same amount that the U.S. imported from the Gulf. See, for example, "Winning the Oil Endgame," Rocky Mountain Institute, 2004. p. 50. Empirical evidence also supports the assertion that efficient driving can reduce fuel usage. For example, the Honda Insight™, a car available to the general public that normally gets 60 mpg, broke records in 2000 by getting 102 miles per gallon in a 7-day drive around the circumference of Britain. The team responsible did this purely by driving more efficiently, and not by modifying the car in any manner.

In most automotive vehicles, an operator controls the power applied to the vehicle (e.g., the engine of the vehicle) by operating the ignition, break and gas petals. Additional control is typically provided by operational assisting devices, such as a cruise control, that help to keep the vehicle at a constant speed, or within a range of speeds. However, such operational assisting devices typically do not optimize the power consumption of the vehicle, or control the speed and/or power provided to the vehicle based on an optimal power consumption level.

Many parameters may impact the optimal power consumption of a vehicle, including external factors (e.g., forces and conditions that act on the vehicle), internal conditions (e.g., the current status of the vehicle and it's component parts.), operator commands (e.g., control commands from the operator driving or preparing to drive the vehicle), and operational parameters of the vehicle (e.g., performance capabilities of the vehicle based on the make and model and/or the component parts of the vehicle, as well as the historical performance of the vehicle).

In recent years the need for energy efficient vehicles has increased as the cost and availability of traditional fossil fuels has fluctuated. However, the need for fuel efficiency spans all types of vehicles, including currently available vehicles (e.g., internal combustion, solar, electric, and hybrid vehicles), as well as vehicles proposed or under development (e.g., hydrogen fuel cell vehicles and other electrically-fueled vehicles). In all of these types of vehicles, the overall fuel efficiency (regardless of the type of fuel), can be improved by optimizing the power supplied to the engine. As described herein, energy efficiency may be fuel efficiency or power efficiency. Energy supplied to the vehicle (e.g., the engine) may come from any appropriate source (e.g., gas, solar, battery, hydrogen, ethanol, etc.).

Thus, there is a need for devices and systems for controlling the power applied to a vehicle engine. The devices, systems and methods described herein address many problems identified for controlling the power supplied to automotive engines raised above.

SUMMARY OF THE INVENTION

The invention concerns an apparatus comprising an interface, a memory and a processor. The interface may be configured to receive sensor data samples during operation of a vehicle. The memory may be configured to store the sensor data samples over a number of points in time. The processor may be configured to analyze the sensor data samples stored in the memory to detect a pattern. The processor may be configured to manage an application of brakes of the vehicle in response to the pattern.

Described herein are devices, systems, and methods for managing the power consumption of an automotive vehicle, and thereby for optimizing the power consumption of the vehicle. The devices and systems for managing the power consumption of the vehicle typically include power management logic that can calculate an applied power for the vehicle engine based on information provided from the external environment of the vehicle, the operational status of the vehicle, one or more command inputs from a driver, and one or more operational parameters of the vehicle. The information provided to the power management logic may come from data inputs (e.g., sensors, telemetries, etc.), memory, user commands, or it may be derived. The power management logic may comprise software, hardware, or any combination of software or hardware. In some variations, the devices and systems include a processor (e.g., a microprocessor) that can perform the power management logic, and provide an applied power. The applied power that is determined by the power management logic may be used to control the vehicle engine. For example, the power management logic may be used by a motor control mechanism to control the application of power to the vehicle engine as the vehicle travels along a route (either a predetermined or a non-predetermined route). The applied power may also be expressed as an optimized speed or speeds to which the vehicle is controlled. For example, the motor control mechanism may adjust the speed of the vehicle to an optimized speed or speeds as the vehicle travels. Or, the device or system y provide a suggested fuel-efficient speed to the driver, who in turn manually adjust his/her speed. Thus, the devices, systems, and methods described herein may optimize the power consumption of an automotive vehicle by controlling the final speed of the vehicle, for example, by controlling the power applied to the vehicle motor.

The system may be manually engaged by the operator either when the vehicle is turned on, or in the midst of a trip (e.g., "on the fly"). In one variation, the operator sets a preferred speed, and a range at which to manage that speed (e.g., the preferred speed may be 60 mph, and the range can be 5 mph) over at least a portion of the trip. The system may determine an optimal (e.g., fuel efficient) speed within the range selected. By calculating and then averaging the efficient speed over a given route, the system can optimize energy usage within the driver's stated speed and range. The power management logic may determine energy efficiency over the course of a trip, based on current location and destination. The destination of the driver does not have to be known (e.g., input into a GPS or other similar system by the driver). The system (e.g., anticipated destination logic) may infer the driver's destination based on a subset of the information inputs to the system, such as the time of day, current location, previous driving habits, and other inputs. In some variations, the driver can manually accelerate (e.g., override the system) for passing, braking and the like. In some variations, the device or system may provide a suggested speed to the driver to match, in order for the driver to better optimize power usage.

In some variations, the system is automatically enabled whenever the vehicle is turned on. In this case, the operator of the vehicle does not have to set any a destination, target speed or range, or the like. By automatically monitoring the operator's real-time speed, braking and acceleration, and by utilizing applicable inputs (e.g., from sensors and/or from a database), the power management system may determine the most efficient speed to travel a route. In some variations the device or system may adjust the vehicle speed automatically. The power management devices or systems described herein may operate whether or not the driver has entered a destination into the GPS, because the system may infer the destination based on previous driving habits if the driver has not explicitly provided a destination.

In some variations, the driver (or other user) provides the system a destination and the vehicle determines the optimal speeds to drive throughout the route. The system may use speed limits, traffic conditions, physical calculations, and statistical models from previous trips to the same destination to select the target speeds to optimize around. Thus, in some variations, the driver only needs to steer, although) hard acceleration or braking by the driver may override the system.

Described herein are devices for managing the power consumption of an automotive vehicle comprising a power management logic operable to calculate an applied power for the vehicle engine from information about the external environment of the vehicle, information about the operational status of the vehicle, one or more command inputs, and one or more operational parameters of the vehicle. The power management device may also include a processor responsive to the power management logic (e.g., a microprocessor), and a motor control mechanism, wherein the motor control mechanism controls the application of power to the vehicle engine.

The power management logic may determine an applied power for the vehicle engine based on information about the external environment of the vehicle that is selected from the group consisting of: the current location of the vehicle, the elevation of the vehicle, upcoming elevations of the vehicle, the current slope/grade of the route, the predicted slope/grade of the next segments (or upcoming segments) of the route, speed limit information of the current route segment, speed limit information of upcoming route segments, the condition of the known or predicted route (or a portion thereof), traffic information or data, traffic surrounding the vehicle, the location of stoplights, the timing of stoplights, a map of the roadway the present angle of the sun, the predicted angle of the sun for upcoming route segments, the weather around the vehicle, present wind direction, the predicted wind direction for upcoming route segments, present wind velocity, the predicted wind velocity for upcoming route segments, current temperature, the predicted temperature for upcoming route segments, current air pressure, predicted air pressure for upcoming route segments, time of day, date, day of week, visibility, present road conditions, predicted road conditions for upcoming route segments, and the distance to/from other vehicles. Any of this information may be acquired by measuring (e.g., from sensors), or it may be detected or input (e.g., from manual inputs, telemetry, detectors, a memory, etc.), or it may be derived (e.g., based on other information, including other environmental information).

The power management logic may determine an applied power for the vehicle engine based on information about the operational status of the vehicle. The operational status information input may be selected from the group consisting of: the vehicle's current speed, the motor speed, the vehicle's current orientation, the RPM of the vehicle's motor, wheel rotations per minute, the battery state, the voltage of the battery, the amp hours from the battery, the state of the battery, temperature of battery, the age of the battery, and the number of times the battery has charged and discharged, the tire pressure, the drag force due to rolling resistance of the vehicle, the weight of vehicle, the amount of air going to the engine, the amount of gas going to engine, and the weight of driver. Any of this information may be acquired by measuring (e.g., by sensors), or it may be input (e.g., from an external telemetry, a memory, etc.), or it may be derived (e.g., based on other information, including other operational status information).

The power management logic may determine an applied power for the vehicle engine based on command input information. Command input information may be selected from the group consisting of: the acceleration applied by a driver, the braking applied by a driver, the intended destination, preferred speed, maximum and minimum range over which speed should adjust, and preferred route. Any of this information may be acquired by input (e.g., from an external telemetry, keyboard, mouse, voice command, a memory, etc.), sensor (e.g., optical detectors, etc.), or it may be derived (e.g., based on other information, including other command information).

The power management logic may determine an applied power for the vehicle engine based on information about one or more operational parameters of the vehicle. Operational parameters may be selected from the group consisting of: aerodynamic parameters (CDA), rolling resistance parameters (Crr1 and Crr2), drive train efficiency parameters, motor efficiency parameters, and battery model parameters battery charge and discharge relationships, type of battery. Any of this information may be input (e.g., from an external telemetry, a memory, etc.), or it may be derived (e.g., based on other information, including historical information or other operational parameter information).

The power management device or system may further comprise a memory containing vehicle information about one or more operational parameters for the vehicle. The memory may store any of the information about the external environment, operational status or command inputs, including derived or historical information.

The devices and systems described herein may be used with any appropriate vehicle, including internal combustion vehicles (which run on gasoline, diesel or ethanol for example), a hybrid internal combustion/electric vehicles, electric vehicles powered by the electric grid (plug-in), electric vehicles powered by the sun (solar), and hydrogen fuel cell vehicles.

Also described herein are systems for managing the power consumption of an automotive vehicle, comprising a first input, operable to receive information about the external environment of the vehicle, a second input, operable to receive information about the operational status of the vehicle, a third input, operable to receive one or more command inputs from a driver of the vehicle, a memory containing information about one or more operational parameters of the vehicle, power management logic operable to calculate an applied power for the vehicle engine from the first input, the second input, the third input, and the memory, and a processor responsive to the power management logic. The system may also include a motor control mechanism, wherein the motor control mechanism regulates the application of power to the vehicle engine.

Also described herein are methods of managing the power consumption of a vehicle, including calculating an applied power for the vehicle using a processor. The processor (e.g., a microprocessor, etc.) receives a first input comprising information about the environment of the vehicle, a second input comprising information about the operational status of the vehicle, a third input comprising a command input from the driver of the vehicle, and a fourth input comprising vehicle information about the operational parameters of the vehicle. The method may also include the step of applying the applied power to the engine of the vehicle, and/or to notifying the driver of the optimal speed.

The step of calculating an applied power may include determining a route, segmenting the route into one or more segment (or intermediate) destinations, calculating an energy efficient speed for the vehicle to travel to the segment destination, determining an optimized speed for the vehicle to travel to the segment destination, and calculating the applied power from the optimized speed for all of the segments. The applied power may be calculated continuously. For example, the applied power may be calculated at each point (e.g., every segment, or points within a segment) as the vehicle is driven. Thus, over an entire route, the most energy efficient speed at which to drive may be continuously calculated. This may be done by determining a destination, and then coming up with a route for that destination. If the destination is not known (e.g., has not been provided to the power management device or system), a predicted destination may be estimated, based on statistical destination logic (e.g., using map coordinates, and the historical operation of the vehicle). Energy efficient speeds for current and upcoming route segments can then be calculated based on the route. In some variations, the route is divided up into segments. In some variations, the optimized speed for the vehicle is determined based on historical speeds for similar destinations. The route can be revised (e.g., continuously revised) during operation.

DETAILED DESCRIPTION

The power supplied and used by a motorized vehicle can be optimized based on information inputs including: user demands, environmental conditions, the current or anticipated operational state of the vehicle, and the operational parameters for the vehicle. These parameters can be estimated, directly measured, or derived, and may be used to determine the driving route, and therefore an estimated power requirement for the route. The estimated power requirement for a route and a historical power requirement from the same vehicle traveling over the same route may be used to determine the optimal power supplied to the vehicle. The power required of a vehicle and the optimal power supplied to a vehicle may also be expressed in terms of the speed or velocity of the vehicle.

Management of a vehicle's power supply typically involves optimization of the power supplied to the engine. As described herein, the "engine" may refer to any portion of the vehicle to which power is supplied, including the motor, powertrain, etc. As will be apparent below, optimizing the power supplied to the engine typically means minimizing the energy loss from the vehicle, thereby increasing fuel efficiency. The power supplied to the engine may alternatively be optimized based on other criterion. For example, the power supplied to the engine may be optimized with respect to speed or travel time. Furthermore, the devices, methods and systems described herein may be used with any appropriate vehicle, and are not limited to internal combustion vehicles. For example, the devices, methods and systems described herein may be used with vehicles having a hybrid internal combustion/electric engine, an electric engine powered by the electric grid (e.g., a plug-in vehicle), an electric engine powered by the sun (e.g., a solar vehicle), and an electric engine powered by hydrogen fuel cell. Thus the ter "fuel" does not necessarily refer exclusively to hydrocarbon fuels, but may refer to any appropriate power source for the engine.

Figure 1A:
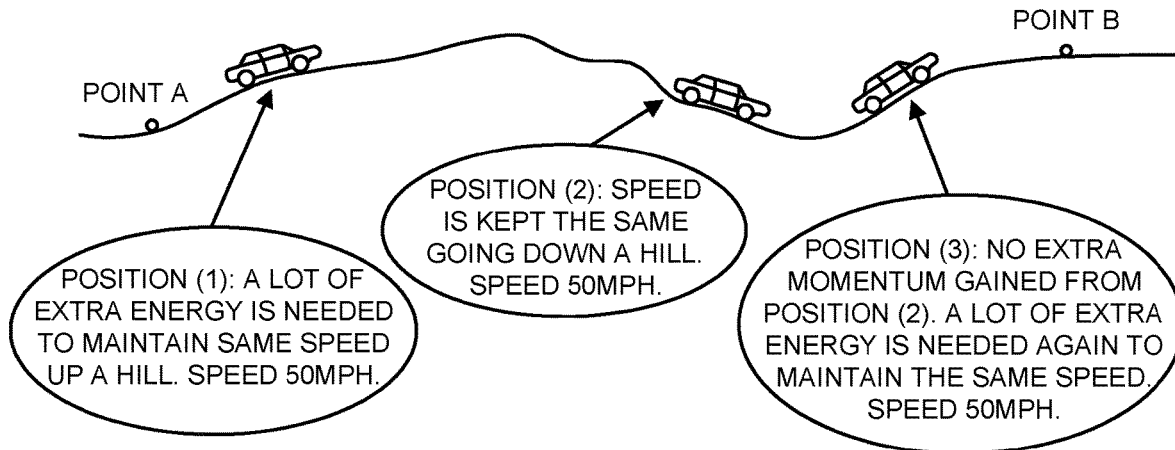
FIGS. 1A, 1B show an example of a vehicle controlled by a traditional cruise control device and the same vehicle controlled by one variation of this power management system described herein.
Figure 1B:
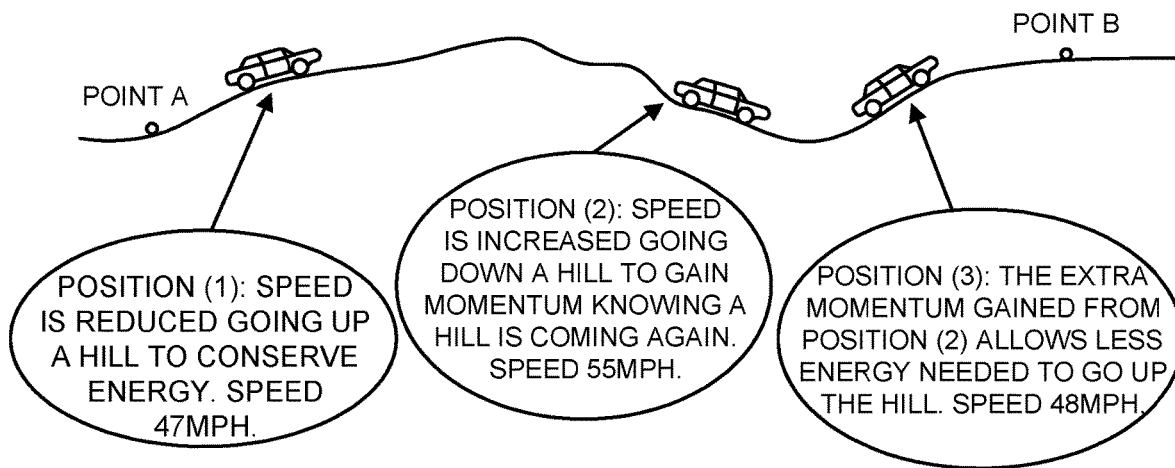

FIGS. 1A and 1B compare a traditional "cruise control" device (in FIG. 1A) to one variation of the power management device described herein (in FIG. 1B). In FIG. 1A, a typical cruise control device regulates the speed of a vehicle as it drives from point A to point B when the vehicle speed is set to 50 mph. As the vehicle moves across different terrain (e.g., roads having different elevations), or through different weather conditions, the traditional cruise control device adjusts the power supplied to the vehicles (and thus the speed) based only on the set velocity and the actual velocity of the vehicle. Thus, the cruise control device receives information on the current speed of the vehicle, and adjusts the power supplied to the engine to maintain the vehicle at the set speed. This type of device is a 'velocity control' cruise control device. In contrast, FIG. 1B shows a vehicle with a power management device for optimizing the power supplied to the vehicle, as described further herein.

In FIG. 1B, the power management system receives external inputs, including information on the location and grade (e.g., steepness of any uphill/downhill portions) of the road, the distances traveled. The power management system also includes or deduces information about the route (e.g., from point A to point B), and the acceptable range of speeds that the vehicle may travel over this route (e.g., between 45 and 55 mph). The power management system may also receive information about the state of the vehicle, including the velocity at which it is traveling, and the weight of the vehicle. Finally, the power management system may include operational parameters such as the performance of the engine, aerodynamic performance, and rolling resistance of the vehicle. Given this information, the power management system may calculate applied power to the engine, and may derive a speed (or set of speeds) that optimizes the applied power. As shown in FIGS. 1A and 1B, the total energy used by the power management system in FIG. 1B is 0.9 kwh compared to 1 kwh for the cruise control system shown in FIG. 1A for identical vehicles traveling over the same pathway.

In general, there are many ways to optimize energy efficiency, as described in more detail below. As will be described, any of the methods, devices and system described herein may be used together, individually, or in different combinations.

Inputs

The power management devices and systems described herein manage the power of the vehicle using inputs from four categories of information input: information from the external environment of the vehicle, information about the operational status of the vehicle, information from one or more command inputs and operational parameters of the vehicle. Typically, at least one input from each of these sources of information is used to determine an optimal speed (or applied power) for the vehicle. Some of the information inputs for each of these categories are described below. In every case, the information may be directly measured (e.g., by sensors or other inputs), communicated from an external source, or it may be derived from other information inputs, or from stored data.

Information from the external environment of the vehicle may be used to determine the optimal power to apply to the vehicle. External environment information generally includes any information about the environment surrounding or acting on the vehicle. External information may be used to determine forces acting on the vehicle (e.g., drag, wind resistance, tire resistance, etc.), the location of the vehicle relative to the destination (e.g., position, direction, etc.), and the environment surrounding the vehicle (e.g., traffic patterns, surrounding traffic, etc.). In some variations, the external information may be used to help describe the power available to the vehicle, particularly in solar powered vehicles (e.g., amount of light energy, time of day, position of the sun, etc.).

Examples of environmental information inputs include, but are not limited to: the current location of the vehicle, geographical information about the surrounding area, the elevation of the vehicle, upcoming elevations of the vehicle, the current slope/grade of road, the predicted slope/grade of the next segments of road, traffic surrounding the vehicle, the location of stoplights, the timing of stoplights, a map of the roadway, the present angle of the sun, the predicted angle of the sun for upcoming route segments, the weather around the vehicle, present wind direction, the predicted wind direction for upcoming route segments, present wind velocity, the predicted wind velocity for upcoming route segments, current temperature, the predicted temperature for upcoming route segments, current air pressure, predicted air pressure for upcoming route segments, time of day, date, day of week, visibility, present road conditions, predicted road conditions for upcoming route segments and the distance from other vehicles.

Some of the information inputs may be redundant, or may be derived from related information. For example, the vehicle location may be provided by a GPS device which may be either a separate device or a portion of the power management device that receives a GPS signal and locates the vehicle based on the received signal. Geographical and topographical information about the area surrounding the vehicle may be determined from the location information. For example, the location may be used to index an atlas of the surrounding area. Some variations of the power management device include a memory or database of information, including information about maps and road information. In some variations, the power management device communicates with one or more such databases to identify the location and surrounding road features (e.g., suggested speed limits, stop signs, traffic patterns, etc.).

The power management device may include or may be connected to sensors or other inputs to directly determine some of the information inputs. For example, the power management device may include a pre-set dock (e.g., for the current time and date), one or more optical sensors (e.g., to determine the intensity of sunlight, visibility, distance from nearby vehicles, etc.), and/or weather sensors (e.g., temperature, wind direction and velocity, air pressure, etc.). In some variations, the power management system receives some of this information by telemetry with off-board information sources such as databases and the like. For example, the power management system may communicate with a weather service, a map service, a traffic service, etc.

These examples of information about the external environment are only intended to illustrate the kinds of external information that may be used by the power management devices and systems described herein and are not intended to be limiting. Any appropriate information about the external environment may be provided to the power management device used by the power management device.

Information about the operational status of the vehicle may be used to determine the optimal power to apply to the vehicle. Operational status information generally includes any information about the current operational status of the vehicle itself. Operational status information may be used to determine the current condition of the vehicle's engine and component parts (e.g., motor, powertrain, battery, tires, etc.), the current fuel supply, the manner in which the vehicle is traveling (e.g., velocity, acceleration, etc.), and the like.

Examples of environmental information inputs include, but are not limited to: the vehicle's current speed, the motor speed, the vehicle's current orientation, the RPM of the vehicle's motor, wheel rotations per minute, the battery state, the voltage of the battery, the amp hours from the battery, the state of the battery, temperature of battery, the age of the battery, and the number of times the battery has charged and discharged, the tire pressure, the drag force due to rolling resistance of the vehicle, the weight of vehicle, the amount of air going to the engine, the amount of gas going to engine, and the weight of driver.

As described above, some of the information inputs may be redundant, or may be derived from related information. Furthermore, the power management system may use any of the sensors, gauges and detectors already present in the vehicle as information inputs. For example, the velocity of the vehicle may be detected by a speedometer which may pass information on to the power management system. The power management device may also include additional sensors, inputs or detectors to determine or derive any information about the operational status of the vehicle. For example, the power management device or system may include one or more weight sensors (to determine the load in the vehicle, including the driver's weight).

The examples of operational status information inputs are only intended to illustrate the kinds of operational status information that may be used by the power management devices and systems described herein. Any appropriate information about the operational state of the vehicle may be provided to the power management device or used by the power management device.

Information from one or more command inputs may be used to determine the optimal power to apply to the vehicle. Command inputs generally include any instructions from the driver of the vehicle about the operation (or intended operation) of the vehicle. Command inputs may be directly input by the user, or they may be derived by the actions of the driver or the identity of the driver. Examples of command inputs include, but are not limited to: the acceleration applied by a driver, the braking applied by a driver, the vehicle's known or predicted final destination, the vehicle's known or predicted interim destination, preferred speed, maximum and minimum range over which speed should be adjusted, and preferred route.

As with all of the information inputs, some of the command inputs may be redundant, or may be derived from related information. For example, a route destination may be input by the driver, or it may be inferred from the driving behavior and/or identity of the driver. The identity of the driver may also be input by the driver, or it may be inferred. For example, the identity of the driver may be matched to the weight of the driver. Command inputs may include any of the drivers actions to control the vehicle. For example, command inputs may include steering, breaking, shifting, or application of the accelerator. The power management device may include sensors, inputs or detectors to monitor the manipulations of the driver. In some variations, the driver may directly input commands to the power management system or to other devices in the vehicle that communicate these command to the power management system. For example, the driver may use an on-board navigational system to select a destination, and this destination may be communicated to the power management system. In some variations, the user may provide commands directly to the power management system. In some variations, the command inputs may be derived from other information, including the environmental information and the operational status information. For example, the destination (either a final or an intermediate destination) may be estimated based on the current location of the vehicle, the direction that the vehicle is traveling, the time of day and/or the driver of the vehicle (e.g., if it's 8:00 am, and driver X is driving the car on interstate 280, then the final destination is most likely to be the address of X's work place).

Information inputs, including command inputs, may have default or pre-set values. For example, the power management device or system may have a preset or default maximum and minimum range of speeds for traveling part of the route (e.g., if the maximum and minimum range has not been explicitly input, the maximum and minimum range may be set to +/−4 mph). In some variations, the information inputs may include metadata describing one or more features of an information input. Metadata may include information about the information input. For example, metadata may indicate the last time a particular data input was updated, or may indicate that the data is a default setting, or the like.

These examples of command inputs are only intended to illustrate the kinds of command inputs that may be used by the power management devices and systems described herein. Any appropriate command input may be provided to the power management device or used by the power management device.

Information from one or more operational parameters of the vehicle may be used to determine the optimal power to apply to the vehicle. Operational parameters generally include information about characteristics that are specific to the vehicle (e.g., characteristics of component parts of the vehicle, including the battery, the engine, the powertrain, the tires, etc.). Operational parameters of the vehicle may be stored and retrieved from a memory that is part of the power management device or system, or they may be retrieved from a remote information source.

Examples of operational parameters include, but are not limited to: aerodynamic parameters (CDA), rolling resistance parameters (Crr1 and Crr2), drive train efficiency parameters, motor efficiency parameters, and battery model parameters, battery charge and discharge relationships, type of battery.

The operational parameters may be fixed (e.g., may not vary with operation of the vehicle), or they may be changed. In some variations, the operational parameters may comprise a database (e.g., a lookup table), so that the value of the operational parameter may depend upon another information input, and may be retrieved from the database by using one or more information inputs as a search key. In some variations, the operational parameter may comprise an equation or relationship that has other information inputs as variables.

Figure 12A:
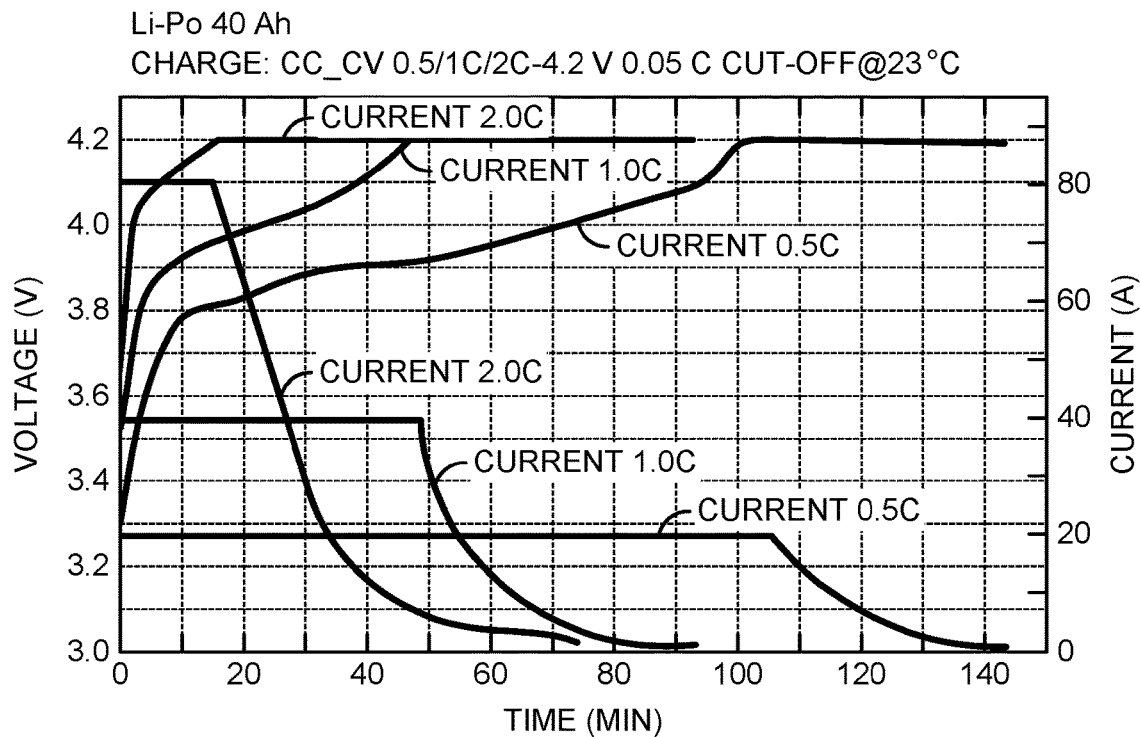
FIGS. 12A, 12B show exemplary charge and discharge characteristics for one type of battery.
Figure 12B:
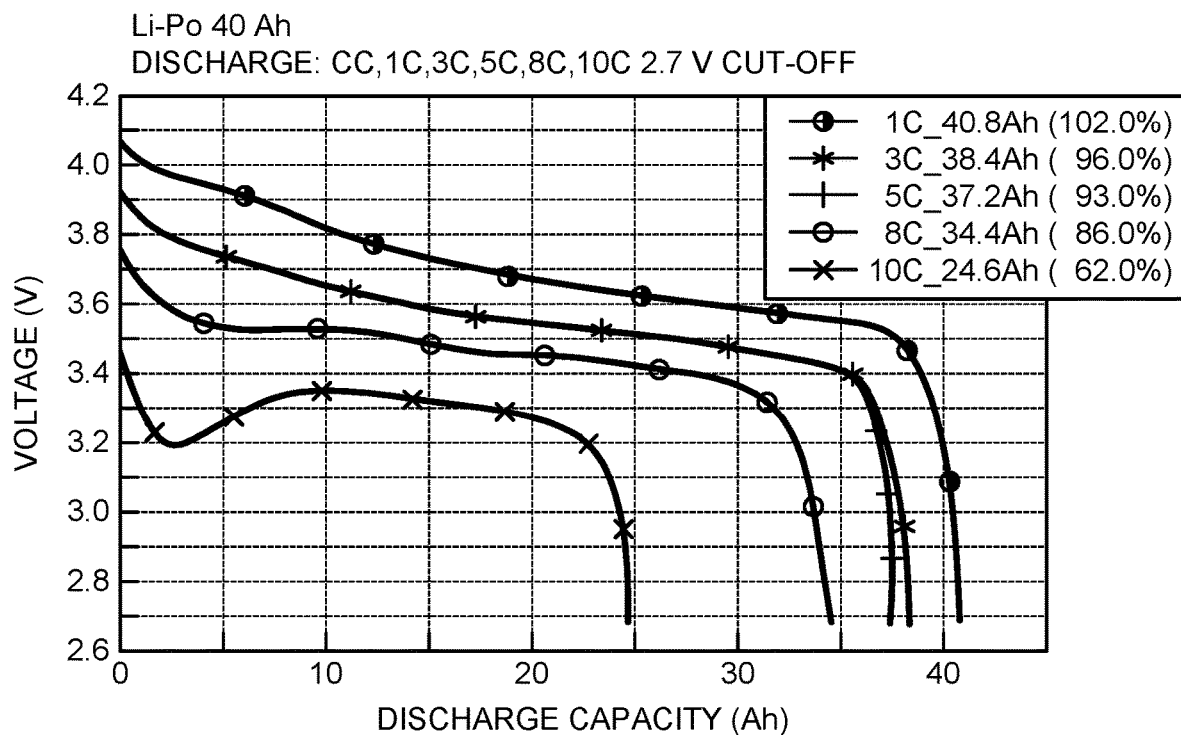

Examples of operational parameters are provided below. In general, operational parameters may be determined experimentally (e.g., by testing) or may be provided by product manufacturers. In some variations, general (or generic) operation parameters may be used if more specific parameters are not available. For example, battery charge and discharge graphs (showing operational characteristics of the battery) can be obtained from battery manufacturers. Operational parameters for various types of batteries (e.g., Lithium polymer batteries, etc.) can include material characteristics, energy densities, power densities, thermal characteristics, cycle life, charge and discharge characteristics (e.g., voltage over time), and current flux over time. For example, FIGS. 12A and 12B show exemplary charge and discharge characteristics for one type of Lithium polymer battery (e.g., the Li—Po 40 Ah from Leclanche SA, Switzerland). Complete characterization may also be made by taking charge and discharge measurements from either a specific battery, or a specific model and make of a battery.

Figure 13A:
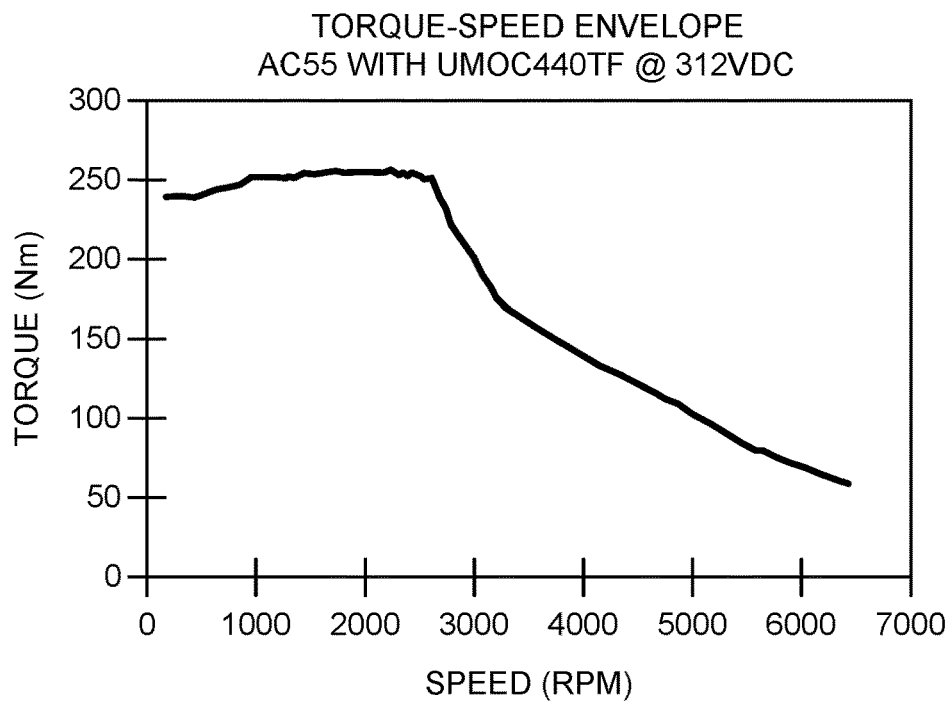
FIGS. 13A, 13B show examples of engine characteristics.
Figure 13B:
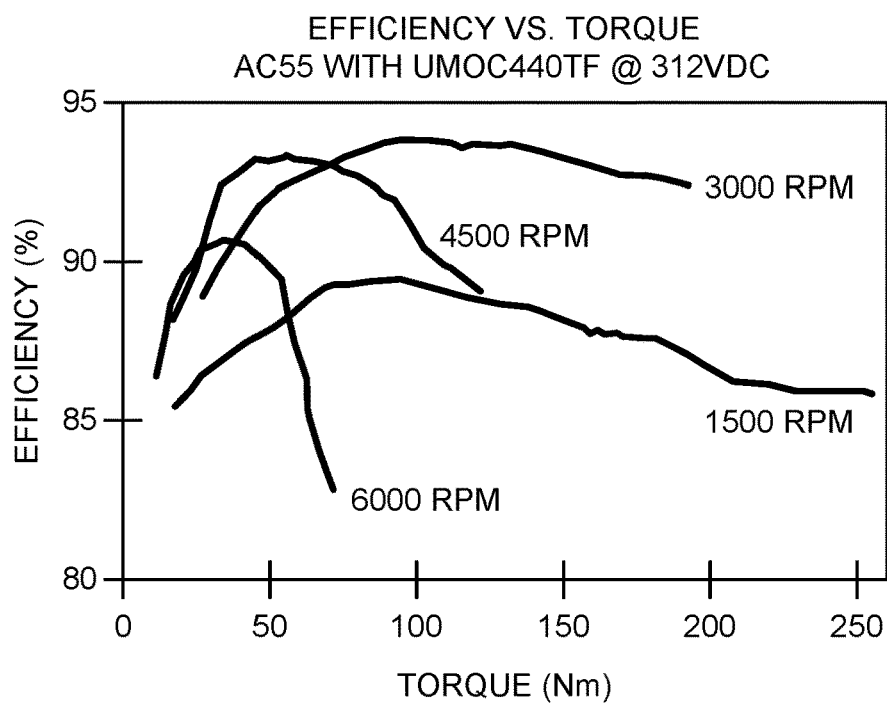

Motor efficiency data may be obtainable from the manufacturer. A full model dynamometer testing may also be used to determine motor characteristics. For example, FIGS. 13A and 13B show some examples of motor characteristics that may be provided. Aerodynamic parameters of the vehicle (e.g., the outer chassis) can also be provided by the auto manufacturer, or could be measured (e.g., in a wind tunnel). Aerodynamic properties may also be estimated or calculated for different vehicles (or vehicle shapes, makes, or models) using literature values. Examples of aerodynamic parameters may be found, for example in "GM Sunraycer Case History/M-101" (Published by the Society for Automotive Engineers, Inc, Dec. 1, 1990), The Leading Edge: Aerodynamic Design of Ultra-Streamlined Land Vehicles (Engineering and Performance) by Goro Tarnai (Robert Bentley, Inc, 1999), and The Winning Solar Car: A Design Guide for Solar Race Car Teams by Douglas R. Carroll (SAE International, 2003), each of which is herein incorporated by reference in its entirety. Examples of drag coefficients are also readily available (e.g., online: http://www.answers.com/topic/drag-coefficient-1, last visited Oct. 12, 2005).

Rolling resistance parameters may also be provided by the tire manufacturer, or may be measured. An example of one variation of a published rolling resistance formula may be found in "Fahrwerktechnik: Reifen and Raeder" by Jörnsen Reimpell and Peter Sponagel (published by Vogel-Fachbuch Technik, ISBN 3-8023-0737-2, 1988), herein incorporated by reference in its entirety. Similarly, a drivetrain efficiency model may be provided by the vehicle manufacturer, or may be measured from the power input vs. the power output for the entire drivetrain. In some variations, (e.g., some variations of solar cars, for example) do not have a drivetrain, since the motor is built directly into the wheel.

Examples of operational parameters are only intended to illustrate the kinds of operational parameters of the vehicle that may be used by the power management devices and systems described herein. Any appropriate operational parameter may be provided to the power management device or used by the power management device.

The information inputs described herein may be used to determine the optimally efficient energy to supply to the engine.

Optimization of Engine Efficiency

Figure 2:
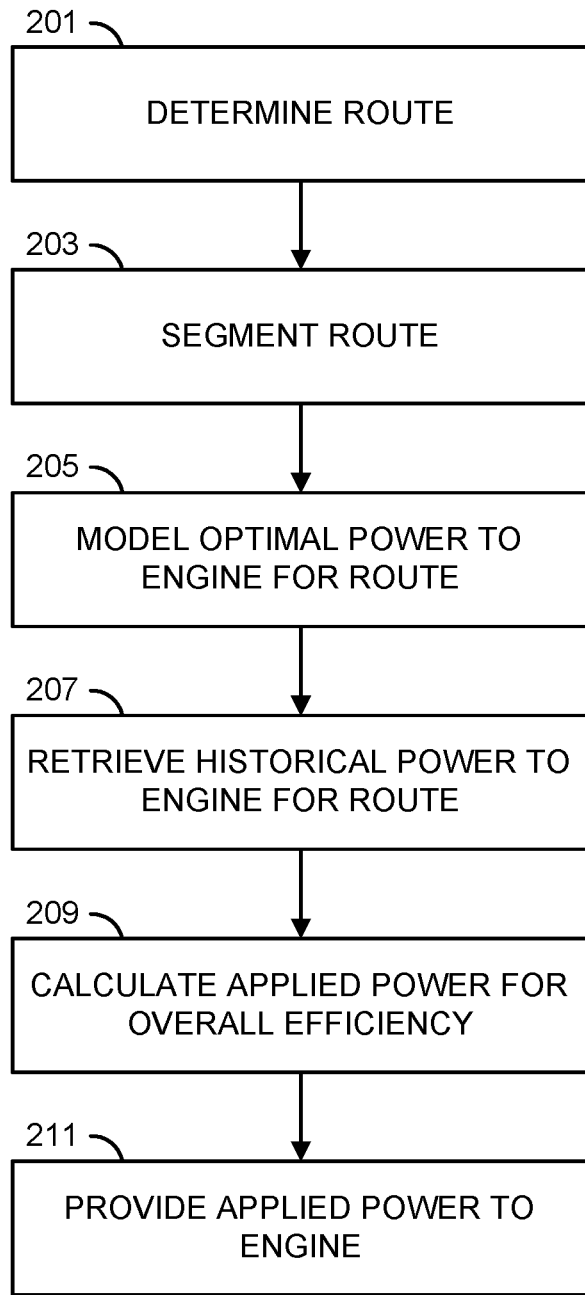
FIG. 2 illustrates steps that may be used to optimize power applied to a motor, as described herein.

FIG. 2 illustrates some of the steps that may be followed to optimize the energy supplied to an engine so that the vehicle travels at a fuel-efficient speed. To determine an optimally efficient speed (or the optimal power to be supplied to the engine), a route is determined 201 from the starting position and an actual or estimated ending position, the route is segmented 203 into one or more segments, a model optimal speed (or power) is calculated 205, statistical data from previous trips along the same segment of the route are retrieved 207, and an overall efficiency applied power is calculated from at least the model power and the statistical data 209. Finally, the overall efficient applied power is provided to the engine. In some variations, the vehicle operator may be notified of the overall efficient applied power instead of (or in addition to) automatically applying this optimal power, Each of these steps is described more fully below. The statistical data from previous trips may be an optional element. For instance, one may choose not the use statistical data or one may not have statistical data.

1. Determine Route

The route is determined based on the current position of the vehicle and a final destination position. The destination position may be explicitly provided by the operator of the vehicle (e.g., as an operator input), or it may be derived. In some variations, the operator may provide a destination directly to the power management device, or to a device that communicates with the power management system (e.g., an on-board navigation system, etc.), The operator may also select the preferred route to the final destination either before beginning the trip, or after beginning the trip. For example, the operator may choose a destination using a navigation system including navigation systems that are not part of the power management device (such as any commercially available GPS navigation systems), which may also generate a route. The GPS navigation system may communicate the destination and route information to the power management device. In some variations, the power management system includes a GPS component or module, and may at least partly act as a navigation system.

The destination may be derived from information about the operator, the current location, the time of day, or the like. The power management device may include statistical destination logic that determines one (or more) most likely destinations based on information provided from environmental inputs, user command inputs, and vehicle operational status inputs. In some variations, the destination is derived by generating a series of statistically weighted (e.g., likely) destinations based on any, all, or some of these inputs. Examples of some of the inputs that may be used by the statistical destination logic to determine a likely destination may include, but are not limited to: the weight of the driver, the time of the day, the current location of the vehicle, the direction that the vehicle is facing (or traveling in), the day of the week, and the speed of the vehicle.

The statistical destination logic may identify one or more destinations based on information held in a memory. For example, the statistical destination logic may use any of the information inputs to select among a record of destinations to which the vehicle has previously driven. These destinations may be assigned a probability weighting based on the information inputs. For example, the statistical destination logic may continuously infer the vehicle's destination. The information inputs can be used to assign a probability to a particular destination. It is important to note that the word "destination" in this context is not necessarily the driver's final destination. It may be an intermediate destination along the route that the statistical destination logic determines has a greater chance than some threshold likelihood (e.g., X %) of being the destination. A threshold likelihood may be preset, and may be varied by the user or by the power management device.

For instance, if a driver leaves her house to go to work, and drives toward the highway, the statistical destination logic may determine that there is a 95% chance that she is going to the highway but only a 75% chance that she is going to go South on the highway. So, if the threshold (X) is 90%, the "destination" in this case would be the highway onramp. Once she gets on the highway going south, the probability that she is going to work may have increased to 92%. Now, the "destination" would be her work. Thus, as the vehicle drives around, the probable destination determined by the statistical destination logic may constantly change to revise the destination or intermediate destination.

In some variations, the statistical destination logic accesses (and may also write to) a memory comprising past destinations that are correlated to some or all of the information inputs (such as location, driver weight, time of day, day of week, direction, velocity, etc.), and/or information derived from these inputs (e.g., driver identity, driving habits, etc.). The list of possible locations may be weighted by the statistical destination logic based on how closely the information inputs correspond to the associated information inputs for these destinations, and may be influenced or refined by the number of times that the driver has driven to this destination. Some of the information inputs (or some combination of the information inputs) may be weighted more heavily than others in determining the likelihood of a destination. Furthermore, the statistical destination logic may select more than one likely destination, including selecting a final destination and one or more intermediate destinations.

One variation of a procedure for determining the most likely destination is described below, and illustrated in FIG. 3B. For example, the schematic route shown in FIG. 3A has 10 junctions (A to J). The probably that a driver will take any particular route from the start position may be described as "P". Thus, Pold is the previous (or old) percentage likelihood of taking a route, whereas P is the newly calculated percentage likelihood. Pold is initially set to 1 because there is a 100% likelihood that your route will go through the place that you are currently at. As used in this example, an intersection is as a junction having more than one choice of direction that you may go in. Examples include highway exits (e.g., you can stay on the highway or take the exit), a four-way stop, and a fork in the road.

Figure 3A:
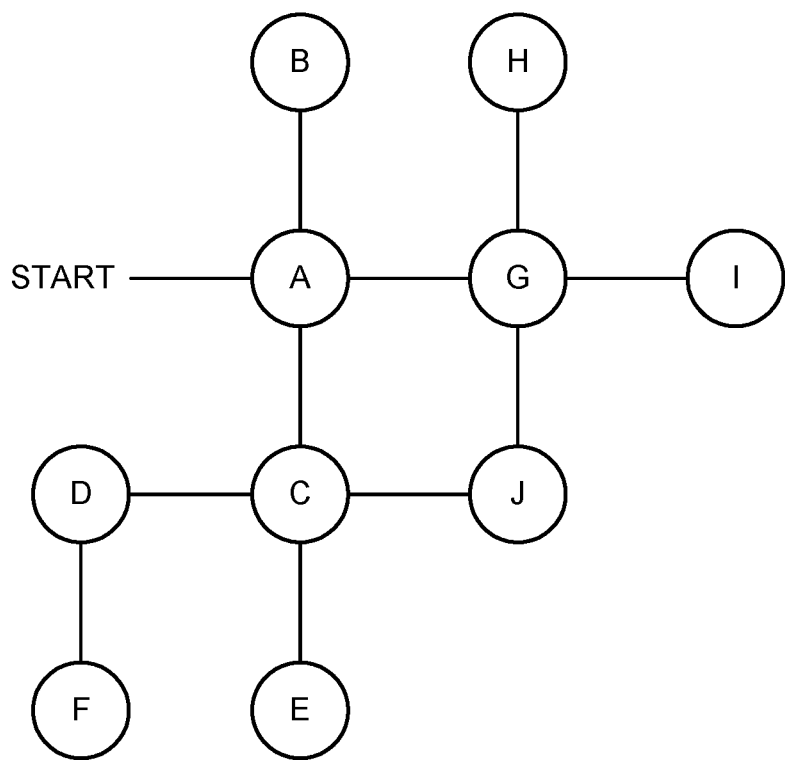
FIG. 3A shows a schematic route as described herein.
Figure 3B:
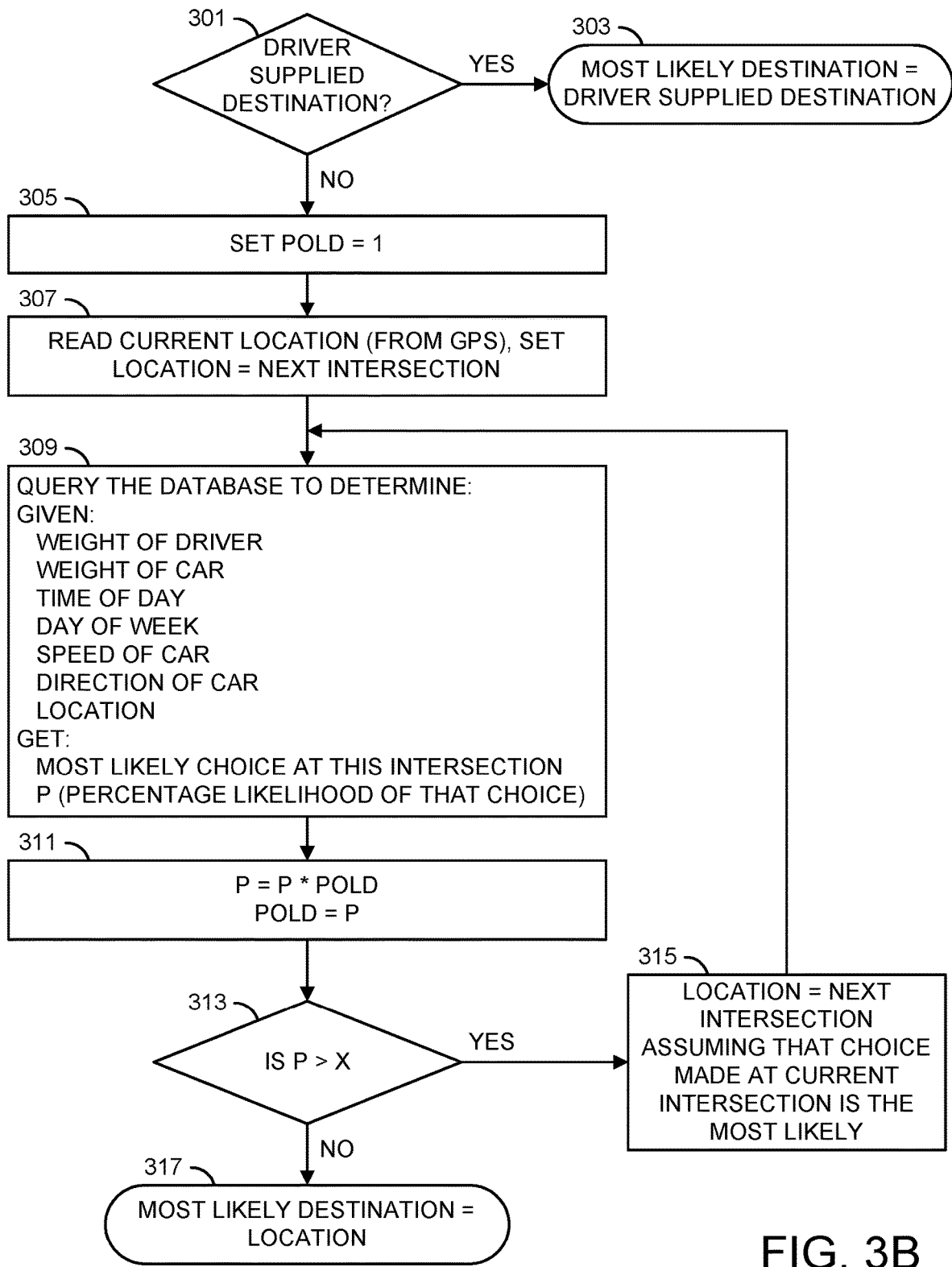
FIG. 3B shows steps that may be followed to determine a route destination.

Referring now to FIG. 3A, assume that you have taken the following trips:
1. start→A→C→E
2. start→A→C→D→F
3. start→A→G→I
4. start→A→G→I
5. start→A→C
6. start A→C→E
7. start A→C→E
8. start→A→G→J→C→E
9. start→A→C→E
10. start→A→C→D→F Based on this trip history, the probably of your taking moving from any junction in the route shown in FIG. 3A can be determined based on this trip history. These probabilities are tabulated in the table:

| Position | Probably of continuing in the possible directions | Probably of going through each location based on past behavior |
| --- | --- | --- |
| start | 10/10 A | |
| A | 7/10 C | A: 10/10 = 100% |
|   | 3/10 G | |
|   | 0/10 B | |
| B | 0/0 | B: 0/0 = 0% |
| C | 2/8 D | C: (10/10)*(7/10) + |
|   | 5/8 E | (10/10)*(3/10)*(1/3)*(1/1) = |
|   | 1/8 end | 71% |
| D | 2/2 F | D: (.71)*(2/8) = 17.75% |
| E | 5/5 end | E: (.71)*(5/8) = 44.375% |
| F | 2/2 end | F: (.1775)*(2/2) = 17.75% |
| G | 2/3 I | G: (10/10)*(3/10) = 30% |
|   | 1/3 J | |
| H | 0/0 | H: 0/0 = 0% |
| I | 2/2 end | I: (.30)*(2/3) = 20% |
| J | 1/1 C | J: (.30)*(1/3) = 10% |

The Table also shows the probably of going through each location based on my previous driving behavior in the next trip. For a new trip, at each junction, the probabilities may be recalculated. For example (on the same trip), once you have reached point A and decided to turn toward C, the new probabilities are recalculated as: A: 0%, B: 0%, C: 100%, D: 25%, E: 62.5%, F: 25%, G: 0%, H: 0%, I: 0%, J: 0%. In real world examples, it could take hundreds of drives before the statistics become useful at predicting where the driver is likely to go. FIG. 3B illustrates one variation of a statistical destination logic that may be used.

2. Segment Route

The route used by the power management device typically includes a starting position (e.g., the current position of the vehicle, which may be indicated by GPS), an ending position, as described above, and any intermediate positions between the initial and the final positions. In some variations, the route may be broken up into segments that may be used by a power management device to optimize the power needed to travel this segment. A segment may comprise any distance to be traveled, including the entire route, or small portions of the route. Different segments in the same route may be of different lengths.

The route may be segmented in any appropriate manner. For example, the route may be broken into segments based on predetermined or anticipated changes in speed (e.g., switching from 65 to 55 mph), changing traffic patterns (e.g., turns, stops, yields, etc.), traffic or anticipated traffic, distance (e.g., x miles), terrain (e.g., the gradient or condition of a road), or the like. In some variations, the route may be segmented based on a combination of such factors.

A route may be entirely segmented, or only partially segmented. For example, the power management device may segment only the first part of the route (e.g., the portion containing the current position of the vehicle), or the first few segments. This may be particularly useful when the destination is an anticipated destination determined by the statistical destination logic, for example. The route may be continuously re-segmented. For example, as the vehicle moves, the power management device may become aware of changing road conditions (e.g., traffic, weather, etc.), or the user may change the route, necessitating re-segmenting. As used herein, "continuously" may mean repeated multiple times, including repeating regularly or periodically.

In some variations, the entire route (or the entire predicted route) may be divided up into N segments. The number (N) of segments may be fixed or may depend upon the route. The more segments that the route is split into, the more accurate the model may be. However, more segments may also require more computing power. Thus, the number of segments N may be decided based on the tradeoff between computing power and accuracy.

3. Calculated Energy for the Route

The power required by the vehicle to travel along a route, or a segment of the route, may be estimated or calculated, and this calculation may be used to determine a calculated speed for the vehicle so that the power usage is optimized or minimized. Such calculations of power requirements at different speeds typically use information inputs from the vehicle, the user, and the environment over the route from the initial position to a destination (e.g., a final destination or an intermediate destination). Any appropriate information input may be used.

Simulation of the power requirement of the vehicle may estimate power requirements at different speeds. Thus, the speed(s) that the vehicle travels the route (or a segment of the route) can be optimized. For example, the simulation could determine the most energy efficient speed for the vehicle to travel over one or more segments by minimizing the power requirement for the vehicle while allowing the speed to vary within the range of acceptable speeds.

In some variations, the power management device includes simulated energy requirement logic that determines the power requirement given the information inputs (e.g., information from the external environment of the vehicle, the operational status of the vehicle, information from one or more command inputs, and operational parameters of the vehicle), The simulated energy requirement logic can calculate the required applied power for the vehicle by calculating different power requirements for all or a portion of the route (e.g., the first segment) when the speed of the vehicle is within the range of speeds acceptable for traveling this section of the route. For example, if the target speed for a portion of the route is 60 mph with a range of +/−5 mph, the simulated energy requirement logic may determine the speed at which the energy requirement is lowest that is closest to the desired speed (60 mph). Any appropriate method of calculating and/or optimizing this velocity may be used, including iteratively simulating different speeds within the target range.

The optimal speed may be calculated by energy calculation logic. A simplified example is provided below, using the following parameters, assuming an electric car with regenerative brakes.

| mass of the vehicle and the driver (m) | 4000 kg |
|---|---|
| CdA of the car | .25 |
| The rolling resistance coefficients: | |
| Crr1 | .01 |
| Crr2 | .05 |
| Drivetrain efficiency (eff) | 80% |
| air density (rho) | 1.3 kg/m3 |
| acceleration due to gravity (g) | 9.8 m/s2 |
| number of wheels (n) | 4 |
| headwind velocity (vhw) | 10 kph or 2.78 m/s |

In this example, the route may be split into five segments of 5 km each with the following altitudes measured at the end of each segment: 0 (beginning of segment 1), 200 m (end of 1), 100 m (end of 2), 400 m (end of 3), 100 m (end of 4), 0 (end of 5). We may also make the simplifying assumption that the road grade is constant between measured points, and the road grades are calculated to be: +0.04 (seg 1), −0.02 (seg 2), +0.06 (seg 3), −0.06 (seg 4), −0.02 (seg 5). The target average speed is 100 kph.

For the sake of simplicity in this example, we can then calculate the amount of energy required to drive at a constant 100 kph speed for the entire route, as well as for 16 other combinations of the speeds 95 kph (26.39 mps), 100 kph (27.78 mps), and 105 kph (29.17 mps). In practice, this simulation may be run for hundreds or even thousands of combinations of speeds which may be tested to find the optimal speed to drive each segment. It is assumed that we enter the first segment traveling 100 kph (27.78 mps). It is also assumed that the speed listed for the segment is the final speed of the segment and the vehicle accelerates linearly throughout the segment.

The Table below shows the results of the energy calculation for all of the combinations tried. The lowest energy usage is 4275.94 Watt-hours. This was obtained by going 95 kph (seg1), 105 kph (seg2), 95 kph (seg3), 105 kph (seg4), 100 kph (seg5). The average speed over all 5 segments is still 100 kph, but the energy used is 10.2% less.

| iterations | seg 1 | seg 2 | seg 3 | seg 4 | seg 5 | Energy | units |
|---|---|---|---|---|---|---|---|
| 1 | 27.78 | 27.78 | 27.78 | 27.78 | 27.78 | 4763.2484 | Whr |
| 2 | 26.39 | 29.17 | 27.78 | 27.78 | 27.78 | 4536.889 | Whr |
| 3 | 26.39 | 29.17 | 26.39 | 29.17 | 27.78 | 4275.938 | Whr |
| 4 | 26.39 | 29.17 | 26.39 | 27.78 | 29.17 | 4382.5026 | Whr |
| 5 | 26.39 | 29.17 | 27.78 | 26.39 | 29.17 | 4950.1438 | Whr |
| 6 | 26.39 | 29.17 | 27.78 | 29.17 | 26.39 | 4438.3467 | Whr |
| 7 | 26.39 | 26.39 | 29.17 | 29.17 | 27.78 | 4942.6325 | Whr |
| 8 | 26.39 | 26.39 | 29.17 | 27.78 | 29.17 | 5055.9124 | Whr |
| 9 | 26.39 | 26.39 | 27.78 | 29.17 | 29.17 | 4784.1865 | Whr |
| 10 | 29.17 | 26.39 | 27.78 | 27.78 | 27.78 | 5013.2565 | Whr |
| 11 | 29.17 | 26.39 | 26.39 | 29.17 | 27.78 | 4745.585 | Whr |
| 12 | 29.17 | 26.39 | 26.39 | 27.78 | 29.17 | 4852.1495 | Whr |
| 13 | 29.17 | 26.39 | 27.78 | 26.39 | 29.17 | 5137.6625 | Whr |
| 14 | 29.17 | 26.39 | 27.78 | 29.17 | 26.39 | 4914.7142 | Whr |
| 15 | 29.17 | 29.17 | 26.39 | 26.39 | 27.78 | 4602.8845 | Whr |
| 16 | 29.17 | 29.17 | 26.39 | 27.78 | 26.39 | 4493.3028 | Whr |
| 17 | 29.17 | 29.17 | 27.78 | 26.39 | 26.39 | 4765.4617 | Whr |

Figures 4, 4A:
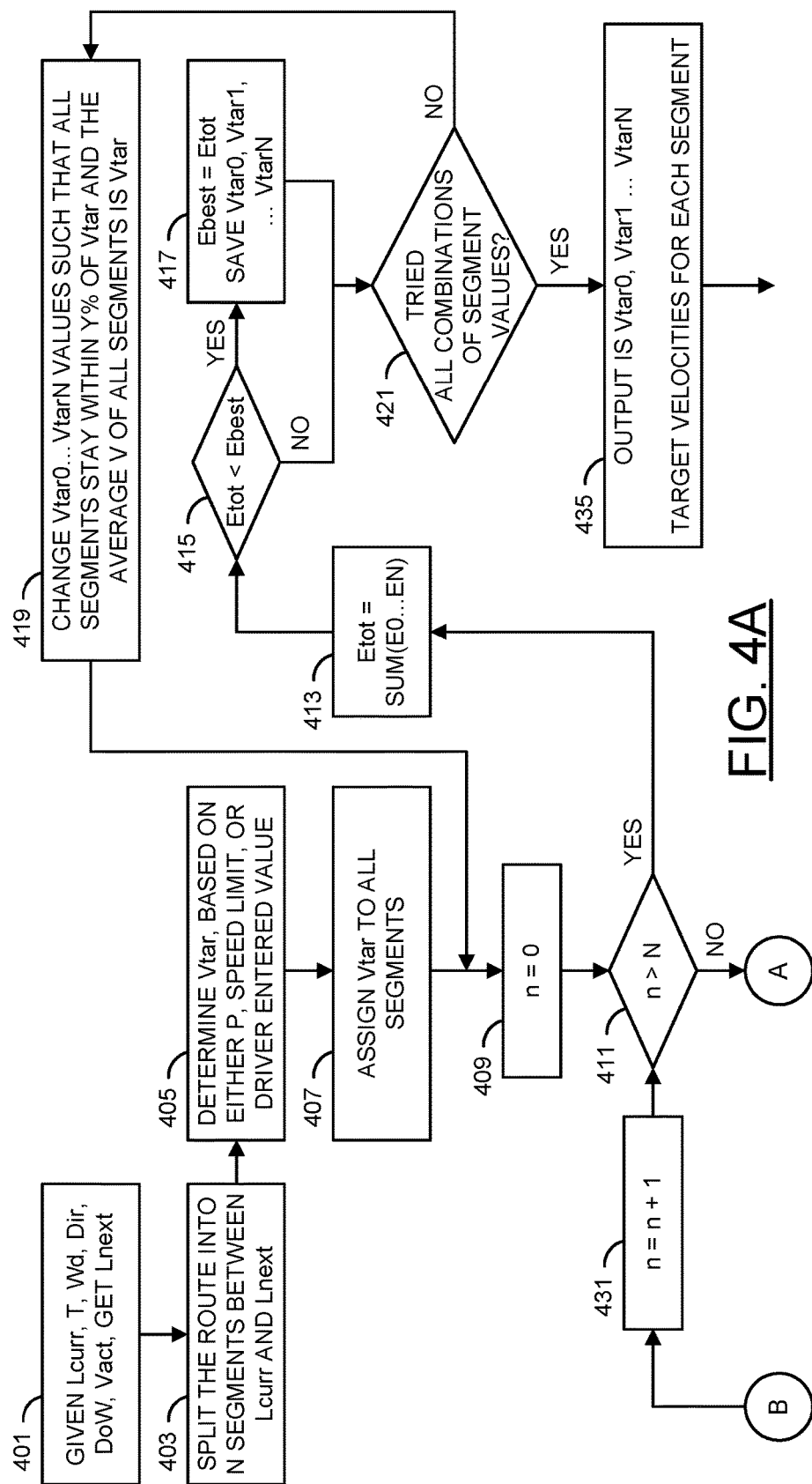
FIGS. 4A, 4B show steps that may be followed to determine a calculated optimized velocity for segments of a route.
Figure 4B:
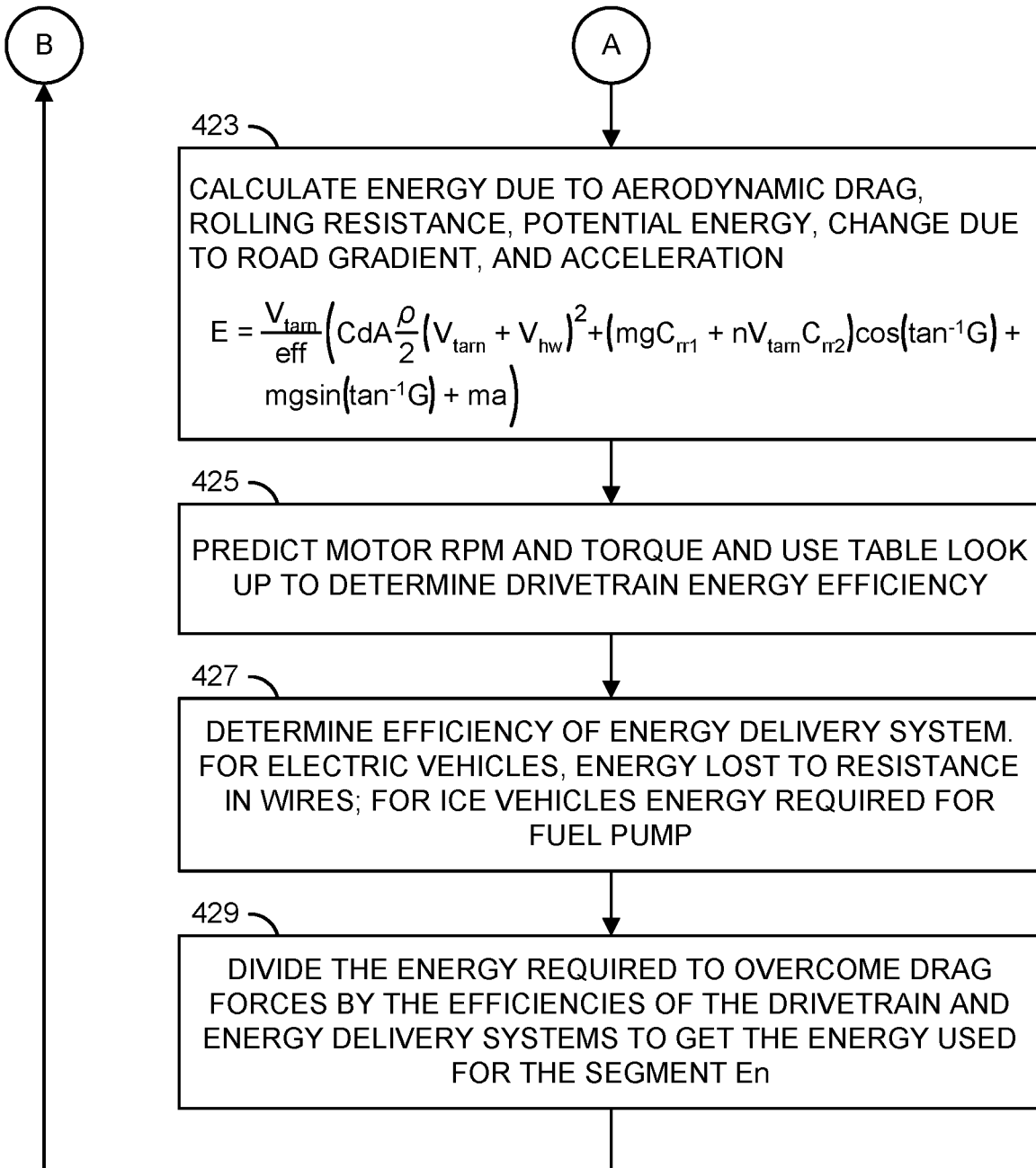

In general, any appropriate relationship between the information inputs, the speed (e.g., the applied power) and the required energy may be used to determine an optimized speed. In some variations, the energy requirement may be calculated from aerodynamic information, rolling resistance, potential energy change due to road gradient and acceleration. FIGS. 4A, B show one method of determining the target speeds for a route by an iterative method. One variation of a method for determining target speeds is described by the equation:

$$E = \frac{V_{tarn}}{\text{eff}} \left( CdA \frac{\rho}{2} (V_{tarn} + V_{hw})^2 + (mgC_{rr1} + nV_{tarn}C_{rr2})\cos(\tan^{-1}(G)) + mg\sin(\tan^{-1}(G)) + ma \right)$$

where E is the total energy used over the segment. The terms of the equation include:

$$\frac{V_{tarn}}{\text{eff}}$$

where $V_{tarn}$=target velocity over time, and eff is the efficiency of the powertrain.

The terms inside of the parenthesis calculates the total drag force on the vehicle. However, we want to calculate the total amount of energy. In general, Power=Force*Velocity, and Energy=Power*time=Force*Velocity*Time. The total amount of energy used is increased based on the power lost due to the inefficient powertrain.

The drag force due to the aerodynamics of the car is expressed as:

$$CdA \frac{\rho}{2} (V_{tarn} + V_{hw})^2$$

where CdA is the coefficient of drag time area (which can be a measured value), and rho ($\rho$) is the density of air, $V_{tarn}$ is the target velocity in the nth iteration, and $V_{hw}$ is the headwind velocity. The drag force due to the rolling resistance of the tires is expressed as:

$$(mgC_{rr1} + nV_{tarn}C_{rr2})\cos(\tan^{-1}(G))$$

where m is the mass of the car, g is the acceleration due to gravity, n is the number of wheels, Vtarn is the target velocity in the nth iteration, $C_{rr1}$ and $C_{rr2}$ are the coefficients of rolling resistance, and G is the grade of the road. The coefficients of rolling resistance may be measured values or they may be values supplied by tire manufacturer (e.g., tire manufacturer), The numbers may vary for different road surfaces as well.

The force due to the road gradient is:

$$mg \sin(\tan^{-1}(G))$$

where m is the mass of the car, g is the gravitational constant, and G is the grade of the road. The force due to the acceleration of the car is ma (the mass of the car times the acceleration over the segment, assuming linear acceleration for the segment).

Putting everything together, the equation can be solved for E, the total energy used over the segment. Similar equation are described for calculating the total energy used over a segment in "The Speed of Light, The 1996 World Solar Challenge" by Roche, Schinckel, Storey, Humphris, and Guelden (UNSW, 1997), herein incorporated by reference in its entirety.

FIGS. 4A, B describe a method of calculating an array of optimized velocities for an entire route that has been broken up into segments. In some variations, only one or a subset of optimized speeds are calculated.

Variations on the above equations may be made to simplify the relationships or to include additional factors. For example, the speed varying part of the rolling resistance equation may be removed to simplify the equation to:

$$mgC_{rr} \cos(\tan^{-1}(G)).$$

Additional factors could be added as well, for example by including the variation of the motortrain efficiency with speed, or by including the variations of the CdA depending on the directionality of the wind.

4. Historical Route Information

The power management device may refer to a record of historical route information. For example, the power management device may include a memory or a data structure that holds information on routes or segments or routes that the vehicle has previously traveled. The memory may comprise a database a register, or the like. In some variations, a power management system communicates with a memory or other data structure that is located remotely. The record of historical route information may include the route information (e.g., starting location and any intermediate locations), as well as information about the actual or optimized velocities and/or applied power for the vehicle traveling the route. The record of historical route information may also include any informational from information inputs (described below). For example, the record of historical route information may include information about the time of day, weather conditions, road conditions, driver, etc. Multiple records for the same route (or segments of a route) may be included as part of the record of historical route information.

The record of historical route information may provide statistical information on driving habits. The driving habits of an operator over a particular route or segment of a route may be determined by analyzing the previous times that the driver has taken this route, and by looking at the efficiency (e.g., the power efficiency) for each previous trip, and for the combination of previous trips. Thus, the historical route information may be analyzed by statistical route analysis logic that can determine a probable optimal speed at each point along a route (e.g., at segments along the route). The more times that a driver has driven the route, the more data can be used to estimate a probable optimal speed for all or part of the route.

Historical data may be particularly useful when there is a large amount of such data available. Instead of trying to calculate the predicted power usage based on physics modeling, this method merely looks at all of the previous data to determine the power that would be utilized to drive each segment at a particular speed. For example, in the past, a driver may have driven a particular segment 1000 times. Out of those thousand times, she may have driven it at speeds ranging from 80 kph to 120 kph. For each of those 1000 times that she drove the segment, the car recorded how fast she drove it, and how much energy was used. Therefore, to estimate how much energy would be required to drive the segment at 95 kph, the power may be estimated by taking an average of all of the previous times the driver drove that segment at 95 kph to arrive at an estimated energy usage, rather than calculating the power from the physics calculations, as described above. In one variation, only the previous trips along the segment made under approximately similar conditions are considered (e.g., similar cargo weight, headwinds, etc.).

Figure 5:
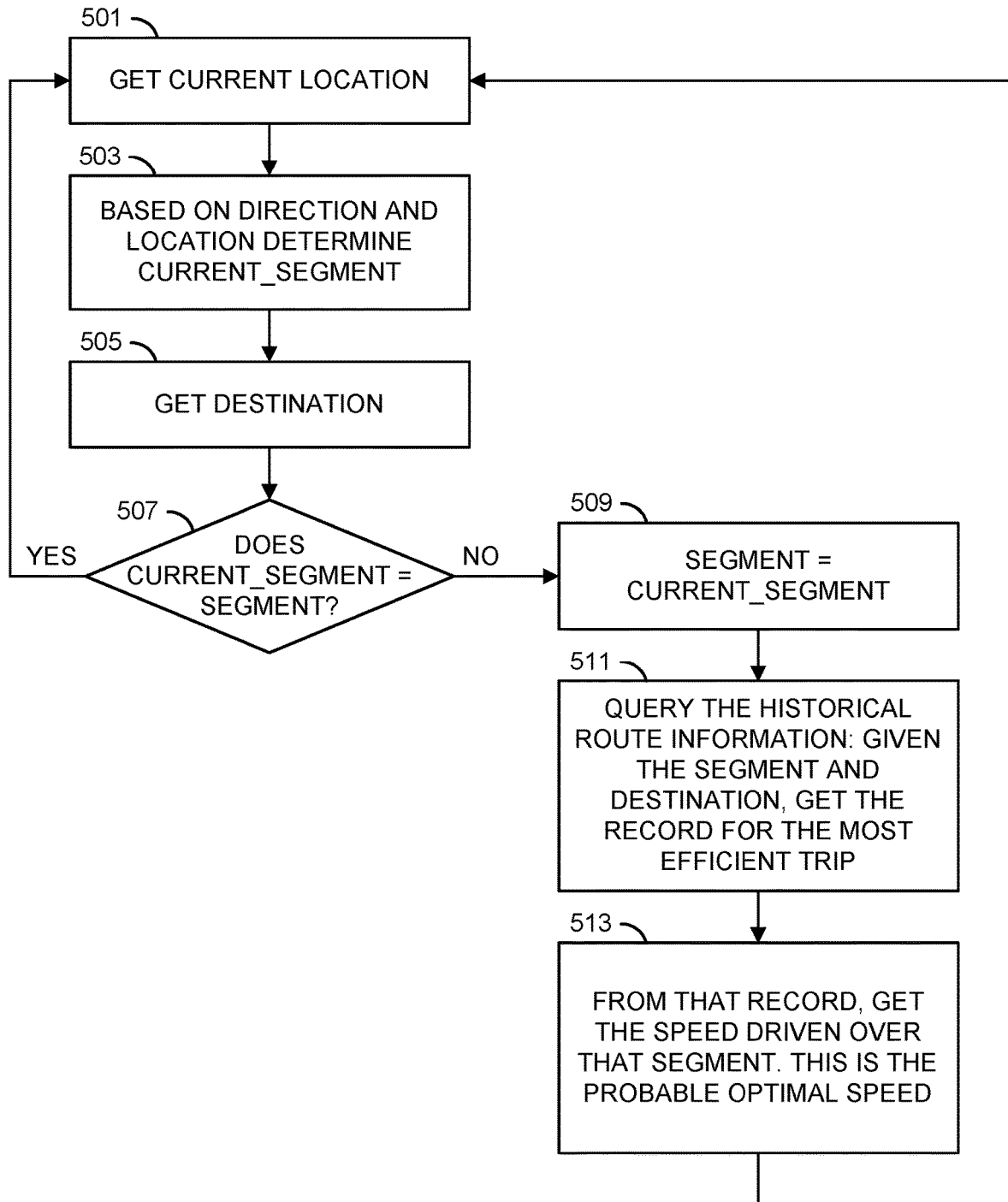
FIG. 5 shows steps that may be followed for determining a probable optimal speed based on historical route information.

FIG. 5 describes one method of using historical data to determine a Probable Optimal Speed. This speed most likely approximates the optimal speed, based on previous trips. In general, this method is most accurate when there are many similar previous trips to be in the database. FIG. 5 shows that, the location of the vehicle is periodically determined (e.g., via GPS, manual entry etc.), and this location can then be used to determined a historical segment corresponding to the current location. As described above, every route may be divided into a finite number of segments, and the more segments that the route is split into, the more accurate the algorithms may be. However, additional segments also increase the computing power needed. The destination is also determined periodically 505 (e.g. as the vehicle is moving), and is reevaluated based on the current location. It can then be determined if the vehicle is in the same segment as previously determined or if it has entered a new segment 507 since reevaluating the vehicle location. If the answer is "yes," then nothing needs to be done until the next time the location is measured. If the answer is "no" then the database is examined to find the historical information about this segment. For example, the historical information is queried to determine what speed the vehicle was traveling every time that the vehicle (or the specific driver of the vehicle) was in the same segment going to the predicted destination. In particular, the historical information is queried to determine how fast the vehicle was traveling during the trip in which the vehicle used the least amount of energy over the same route. The result of this query gives a speed that is most likely the best (e.g., most efficient) speed to travel for the current trip. The process can iteratively repeat for the next location measurement as the vehicle continues.

FIG. 5 describes a method of determining a probable optimal speed using historical route information. In FIG. 5, the probable optimal speed is identified from the historical route information as the most efficient speed (e.g., the speed having the lowest energy requirement) used by the vehicle when traversing the segment, when that segment is part of a route having the same destination as the current destination. The flowchart shown in FIG. 5 illustrates a continuous process, in which the power management device can determine a probable optimal speed as the current segment changes (e.g., as the vehicle moves).

In some variations, probable optimal speeds may be identified for the entire route. For example, the predicted or actual route may be segmented, and an array of probable optimal speeds may be identified from the historical route information for each segment. In some variations, the probable optimal speed is not a single most efficient speed for a segment of a route, but is derived from a combination (e.g., an average, median, weighted average, etc.) of all or a subset of the historical route information speeds. In some variation, only a subset of the historical route information is used. For example the probable optimal speed may be driver specific, so that only information for a specific driver is used to calculate a probable optimal speed. Drivers may be identified by bodyweight, or some other information input, including self-identification. If there is no historical route information for the segment or route being examined, then the probable optimal speed may be set to a predetermined value (e.g., zero), or some other indicator may be toggled so that the probable optimal speed is not relied upon.

In one variation, a reliability estimate may be assigned to the probable optimal speed. For example, a reliability estimate may be related to the number of data points (e.g., the number of times that the vehicle (or a driver driving the vehicle) has driven that segment or route. For example, if there are no records of the vehicle driving the route, the reliability estimate may be set very low. Generally, the more records for a route in the historical route information, or the more closely the identifying information in the record matches the information about the current route (e.g., the driver, weather conditions, traffic, etc.), the higher the setting of the reliability estimate.

5. Calculation of an Efficient Speed Output

Finally, an efficient speed for the vehicle to travel the route (or a part of the route) may be determined from the calculated optimized speed and the probable optimal speed. The optimum speed is the most efficient speed (E), as described above. This efficient speed (or efficient speed output of the power management system) may also be expressed as the applied power that is provided to the engine to achieve the speed at which the fuel efficiency is optimal. Thus, an efficient speed is typically a function of the driver's current operational demands, the current operational conditions of the vehicle, the operational parameters for the vehicle, and any historical behavior of the vehicle taking the same (or a similar) route.

In general, an efficient speed output is determined by a combination of the calculated optimized speed and the probable optimized speed after they have been appropriately weighted. In some variations, this weighting takes into account the total energy predicted by the calculated optimized speed (e.g., by the simulated energy requirement logic) and the total energy required for the route predicted by the probable optimized speed (e.g., by the statistical route analysis logic). The reliability estimate for the probable optimized speed may also contribute to the weighting. The power management device may include derived efficient speed logic that can determine efficient speeds for the vehicle to travel the route, or a portion of the route. In some variations, the efficient speeds are expressed as power or energy to be applied to the vehicle engine (e.g., the applied power).

As previously mentioned, the methods and logic described above may be used to calculate a speed or an applied power for running the vehicle at an optimal fuel efficiency. As will be apparent to one of skill in the art, the same procedures may be used to determine a speed (or speeds) over the route that minimize or maximize other factors, and are not limited to optimizing only fuel efficiency. For example, the power management device may control the speed of the vehicle so as to minimize the duration of the trip instead of (or in addition to) fuel efficiency. Thus, the simulated energy requirement logic may be expressed as a simulated time requirement, and may calculate the time required to travel a segment of the route as a function of the speed or energy, and additional information input. In this case, calculated optimized speeds may be determined by minimizing the duration of the trip over each segment. Furthermore, the probable optimal speed may be determined from the historical route information based on the duration of travel, rather than the power applied, for each segment.

Control Logic

The power management device may include control logic for controlling the operation of the power management device. Control logic may include logic for acquiring information inputs, communicating with different components of the power management system, estimating the destination of the vehicle from information inputs, segmenting the route into segments, simulating the energy requirements of the engine from information inputs, and controlling the entire power management device or system.

For example, the power management device or system may include polling logic for acquiring information inputs and may also coordinate writing of information from the power management device to a memory. In some variations, the polling logic polls sources of information data that are provided to the power management device. For example, the polling logic may poll data from sensors, inputs, memories, or any other source of information data. The polling logic may further coordinate storing of this data in a memory, such as a memory register or a memory device or database that may be accessed by the power management device or system. In some variations, the polling logic causes old data (e.g., greater than x weeks old) to be overwritten. The polling logic may also control how often the various information data sources are polled. For example, the polling logic may continuously poll data from external environmental sensors (e.g., detecting location, direction, elevation, traffic, weather, etc.) and operational status detectors (e.g., detecting vehicle speed well velocity, motor speed, etc.). The polling logic may also coordinate writing of route information. For example, the polling logic may coordinate recording the decisions made at intersections, and information about routes traveled by the vehicle, and the like. In some variations, the polling logic also coordinates the writing of information derived from the information inputs to a memory. For example, the polling logic may coordinate recording the optimal speed or energy used to traverse a segment or other portion of a route, As described above, the power management device or system may also include statistical destination logic. Statistical destination logic may infer one or more likely destinations based on the information inputs. For example, the power management system may infer the destination of the route based on the current location and direction of the vehicle, and the date and time of day. In some variations, the power management system is unable to infer a final destination, but it can generate an intermediate destination or segment for the route, as described above. The probable destination(s) identified by the statistical destination logic may then be used to optimize the power needed to travel the route or a segment of the route, and to determine a historical probable optimal speed.

In some variations, the power management device or system includes simulated energy requirement logic and statistical route analysis logic. As described above, simulated energy requirement logic may determine a calculated optimized speed for the vehicle, and statistical route analysis logic may be used to determine a probable optimal speed. The power management device or system may also include derived efficient speed logic that determines the most efficient speed or power to be applied to the vehicle engine, as described above.

Figure 6:
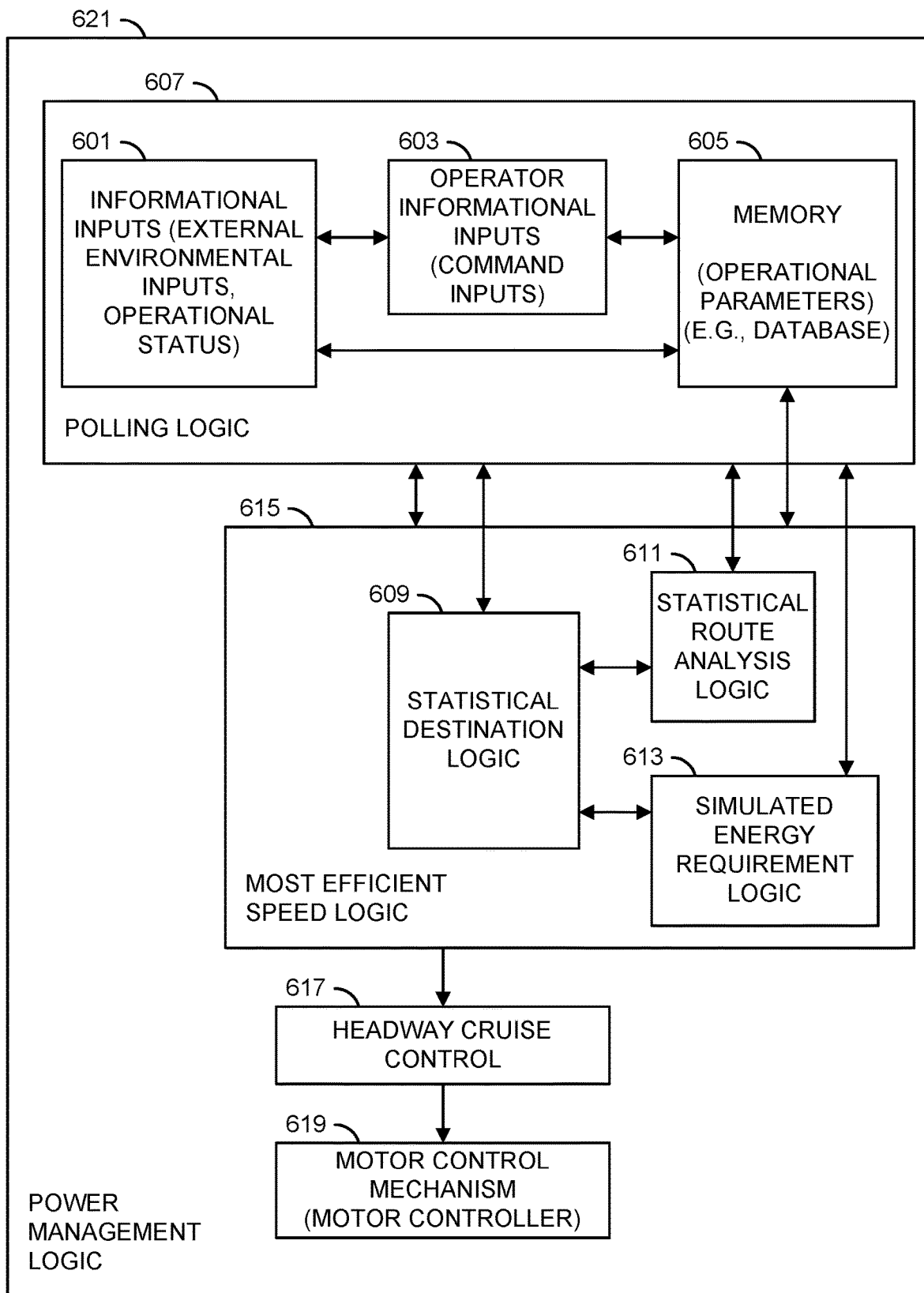
FIG. 6 shows a schematic diagram of one variation of the power management logic described herein.

Power management logic can coordinate different components of the power management system, including the logic components, user interfaces, informational data inputs, memory, processors, motor control mechanisms, and the like. Thus, the power management system may include power management logic to control the overall activity of the power management system. FIG. 6 shows a graphical representation of one variation of the power management device indicating that the power management logic controls and coordinates the various components of the system. In FIG. 6, the polling logic 607 coordinates the activity of information inputs 601, 603, 605. The information inputs are also linked to each other and to the statistical destination logic 609, statistical route analysis logic 611, and simulated energy requirement logic 613. In particular, these elements are all connected to the memory, and may read and write to this memory. The derived efficient speed logic also controls these three logic elements 609, 611, and 613. As described above, the derived efficient speed logic 615 may produce an efficient speed output for each part of the route (e.g., the speeds or applied powers resulting from optimizing the fuel efficiency over the route or parts of the route). Before this applied power can be used to control the motor (via a motor control mechanism 619), the power management logic may check for overrides such as operator overrides (e.g., breaking), or other overrides that may be indicated by the headway cruise control box 617. For example, the operator may override the power management device by applying the brakes, etc. The power management device may also be preempted by an obstruction (such as another vehicle) in the "headway" that blocks the vehicle, requiring the vehicle to slow or stop, FIG. 6 shows one variation of the power management device descried herein. As will be apparent to those of skill in the art, different variations are possible. For example, additional components (e.g., communications elements, microprocessors, memories etc.), and/or additional logic (e.g., route segmentation logic, operator interface logic, etc.) may also be included. In some variations, some of the elements may be omitted (e.g., the separate polling logic), or may be combined with other elements. In some variations, the organization of the elements may be different. For example, the statistical destination logic may be controlled by the polling logic, rather than the derived efficient speed logic.

Power Management Devices

Figure 7:
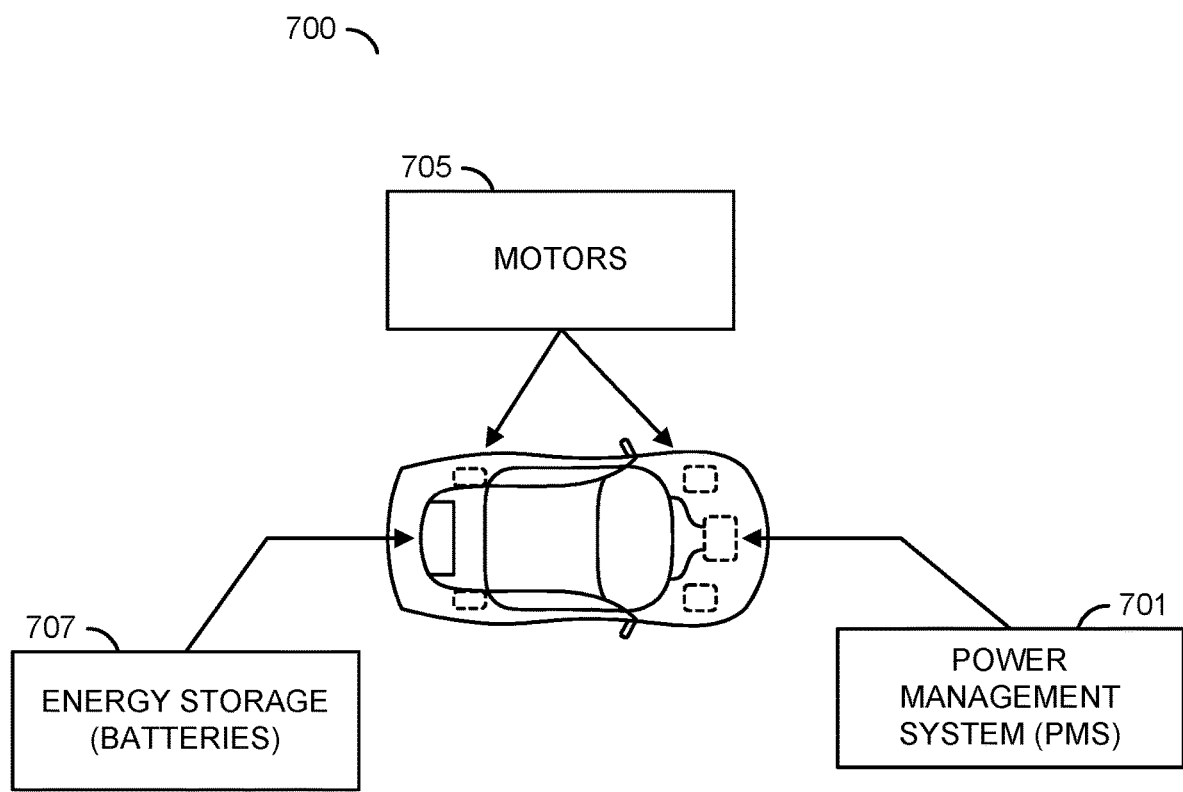
FIG. 7 illustrates one variation of a vehicle including a power management system, as described herein.

In general, the power management device comprises power management logic that receives information input about the external environment of the vehicle, the operational status of the vehicle, one or more command inputs from the driver, and one or more operational parameters of the vehicle. The power management device may also include additional components such as information inputs (e.g., sensors, detectors, relays, etc.), one or more processors (e.g., microprocessors), memories (e.g., databases, ROM, RAM, EPROM, etc.), communications devices (e.g., wireless connections), user interfaces (e.g., screens, control panels, etc.), and/or motor control mechanisms. In some variations, the power management device may be installed into the vehicle by the vehicle manufacturer. In other variations, the power management device may be retrofitted into a vehicle. In general, the power management device or system intervenes between the driver and the engine. In practice, the power management system may be physically located in any appropriate location in the vehicle. FIG. 7 shows one example of a vehicle having a power management system 701 as described herein. In FIG. 7, the power management system is shown in the front of the car 700, connecting the motors 705 and batteries 707. Any appropriate sensors, detectors or data inputs may be used with the power management devices and systems described herein. For example, sensors for detecting external environmental information may be used (e.g., optical, mechanical, electrical, or magnetic sensors). Sensors may be monitored (e.g., polled) in real-time, as described above. For example, polling logic may coordinate continuous or periodic polling of Global Positioning System (GPS) information (e.g., giving information on the vehicle's current location, current elevation, upcoming elevations, upcoming terrain, vehicle's destination, etc.), speedometer information (e.g., vehicle's current speed, motor speed), date and time information (e.g., the date and time may be used to determine personal driving habits and sun angle), gyroscope information (e.g., vehicle's current orientation, current slope/grade of road), RPM (e.g., motor and wheel rotations per minute), accelerator and brake pedal position (e.g., pressure applied and/or current angle of the petals), the angle of sun (e.g., sensors may detect latitude, longitude, time of day, date), weather (e.g., wind direction and velocity, rain, sun, snow, etc.), battery state (e.g., voltage, amp hour meter, etc.), tire pressure (e.g., may be used to calculate the drag force due to rolling resistance), headway control information (e.g., the distance from a car in front of the vehicle), the weight of car (e.g., weight of cargo, passengers, driver), airflow (e.g., the amount of air going to the engine), gas flow sensor (e.g., the amount of gas going to engine of a hybrid or ICE car), weight of driver (e.g., may be used identify the driver and linked to personal driving habits). Different detectors or sensors may be polled at different intervals, including continuously, or only occasionally. Polling may also depend upon the availability of a resource. For example, information may be available only when a telecommunications network (e.g., satellite, cellular, etc.) is available.

In some variations, a memory may be used. The memory may be read/write memory, or read only memory. The memory may include information, such as information on the operational parameters of the vehicle related to the make and model of the vehicle. As described above, operational parameters may include look up tables, charts, or the like. For example, a memory may include information about an aerodynamic model (CDA) for the vehicle, a rolling resistance model (Crr1 and Crr2), a drive train efficiency model, a motor efficiency model, and/or a battery model (e.g., charge and discharge graphs for the battery). In some variations, these models are not part of a memory, but are algorithms or logic.

Any appropriate memory may be used including ROM, RAM, removable memories (e.g., flash memory), erasable memories (e.g., EPROM), digital media (e.g., tape media, disk media, optical media), or the like. In some variations, the memory may comprise a database for holding any of the route information (including historical route information), about the segments traveled, the speeds traveled, energy usage measured or calculated for this route or segment, who the driver was, external environmental conditions while driving the route, operational status of the vehicle while driving the route, and command inputs while driving the route. The power management system may include more than one memory.

The power management system may also include one or more user interfaces. A user interface may allow input of user command information (e.g., selecting a destination, selecting a route, selecting a target speed or speeds, selecting a range of acceptable speeds, etc.). In some variations, a user interface may also provide output from the power management system that can be viewed by the user. For example, the user interface may provide visual or auditory output, or suggest target speeds that the user can match to optimize power supplied to the vehicle. In some variations the user interface may provide status information to the user about the power management system. For example, the user interface may indicate that the power management system is engaged, what the destination (or predicted destination) is, what the optimal speed (or speeds) is, what inputs are missing or estimated, or the like. In some variations, the user interface may display any of the information inputs.

Figure 8:
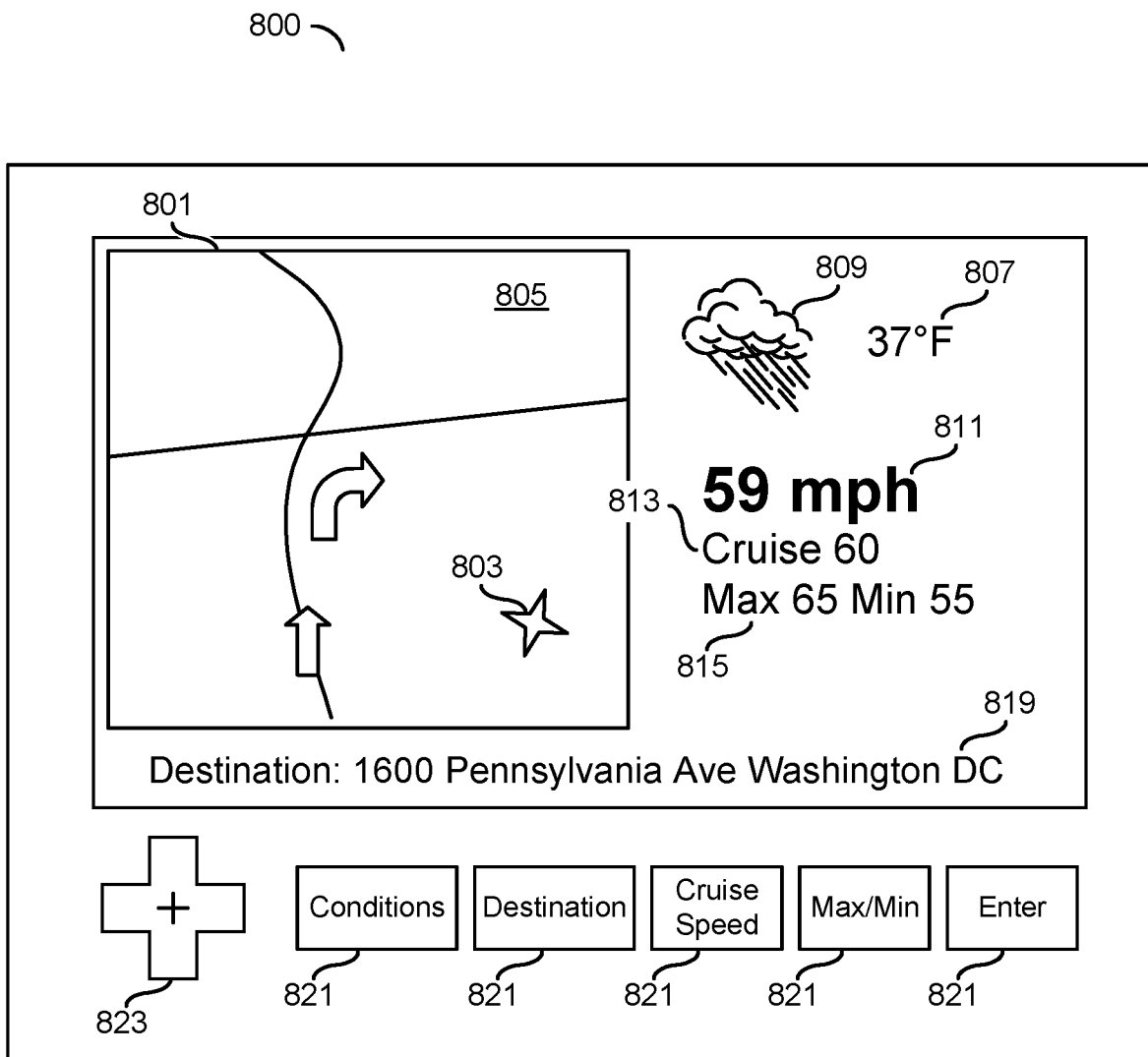
FIG. 8 illustrates a user interface for a power management device.

FIG. 8 shows one variation of a user interface for a power management device or system. In FIG. 8, the user interface 800 includes a screen region 801, that shows a two-dimensional map indicating at least part of the route 805 and the direction of travel 803, the temperature of the external environment 807, the weather 809 (indicated by an icon), the current or derived efficient speed 811, the set (or cruising) speed 813, and the range within which the speed should be maintained 815. The screen region of the user interface shown in FIG. 8 also shows the destination 819.

In some variations, the user interface of the power management system may include multiple screens for displaying information, or for accepting user input. In FIG. 8, the user interface also includes a plurality of buttons 821, including a toggle 823 allowing menu-driven interaction. The user interface may also include messaging features. For example, when the vehicle is turned on but stopped, a user interface may indicate a message has been sent/received (e.g., by flashing, etc.). When the user presses a "Messages" button, the system may display feedback messages. For example, if the tire pressure sensor notices that the tire pressure is low, a message to that effect will be displayed to the user. Diagnostic/test messages can also be sent to this screen for testing, development, or repair purposes. The messaging features may be included on the face of the user interface (e.g., as a "Messages" button 821, etc.).

Figure 9:
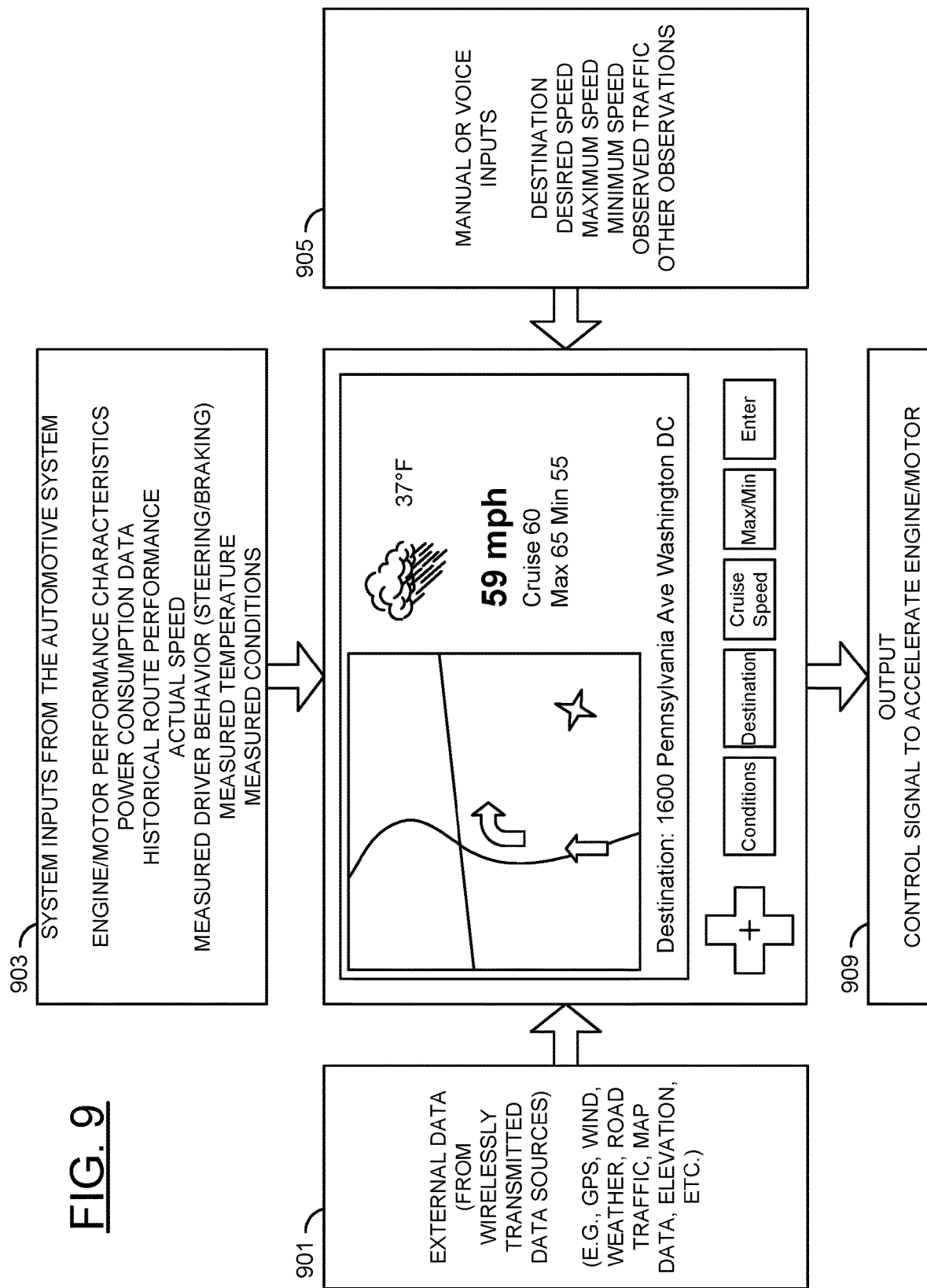
FIG. 9 shows inputs that may be coordinated by the power management user interface.

FIG. 9 illustrates the flow of information in one variation of a power management system. Information inputs into the power management system 901, 903, 905 enter the system and some (or all of them) may be displayed by the user interface. For example, external information inputs 901 may be shown. The status of some of the information inputs (or the status of the detectors that receive the information inputs) may also be shown. For example, the user interface can indicate when the system is connected to an external information input. In some variations, the external information inputs may be connected to the power management system by a wireless transmission (e.g., from an external source), and the connection to the external source may be indicated by the user interface. As described above, the user interface may accept command inputs from the driver (or a passenger) 905. In some variations, user commands may be accepted directly by using buttons on the user interface, or by voice commands. In other variations, at least some of the user commands may be entered into the power management system from another source (e.g., a separate cruise control or GPS device). Finally, the user interface may indicate the output of the power management device or system 909, typically an efficient speed output for the engine.

In some variations, the power management system may include a headway cruise control. The headway cruise control can prevent collisions when the vehicle is in motion by overriding the power management control system's control of the vehicle speed. In some variations, the headway cruise control detects the proximity of other vehicles or obstacles in the road ahead. The headway cruise control may include sensors on the vehicle, such as laser, ultrasound or other electronic distance measurement devices. Increasingly, more vehicles are including some sort of GPS interface to communicate with other vehicles to determine distance between the vehicles to avoid collisions.

The power management devices and systems described herein may also include a motor control mechanism. The motor/engine controller changes the motor speed by mechanical operations such as pulling on a cable to adjust gas/airflow mixture or by electrical means with either analog or digital inputs by the driver. With electric driven motors, a variable may be changed to increase or decrease motor speed. In the cruise control settings, the speed of the motor may change based algorithm in the processor.

Figure 10:
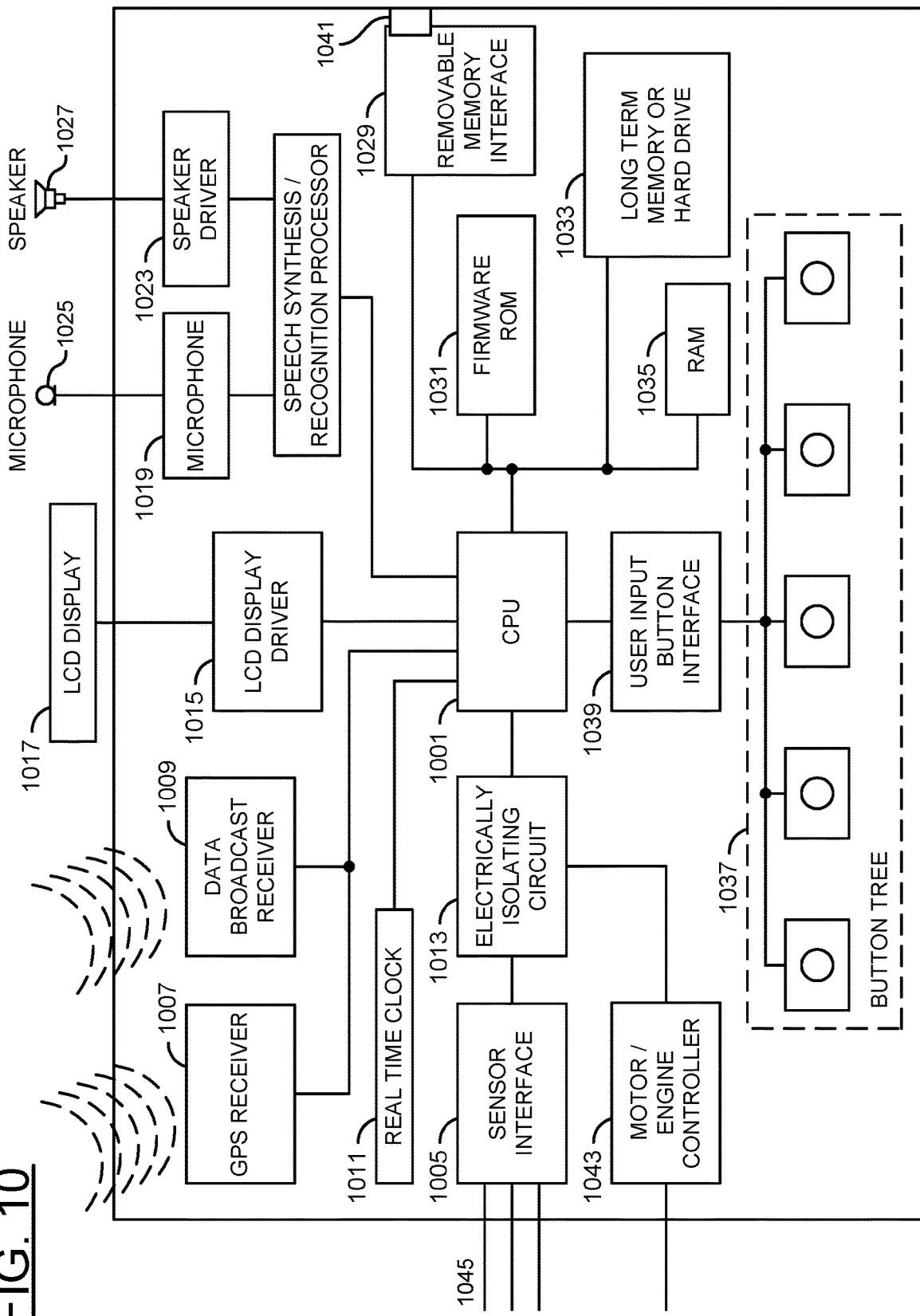
FIG. 10 shows a schematic diagram of a portion of a power management system, as described herein.

The power management devices and systems described herein may be organized in any appropriate manner, as described above. For example, in some variations, the power management device described herein may include component parts that are connected as illustrated in FIG. 10. FIG. 10 shows a schematic of one variation of a power management device. In FIG. 10, the power management system includes a central processor 1001 (CPU) that can execute control logic such as power management control logic, statistical destination logic, simulated energy requirement logic, statistical route analysis logic, derived efficient speed logic, polling logic, etc. This CPU receives inputs from sensors 1005, GPS receiver 1007, a clock 1011, a telemetry data receiver 1009, a speech recognition processor 1021 (including a microphone 1019, 1025), user interface buttons 1039, 1037, and memory components (including RAM 1035, a long-term memory 1033 firmware ROM 1031, and a removable memory 1029, 1041). The CPU may also coordinate output through the LCD display 1015, 1017, a speaker 1023, 1027, and the motor control mechanism (motor controller) 1043. In some variations, the sensors 1045 may also be included as part of the power management devices or systems.

As described above, the power management system may also be used with a telemetry system. Thus, the power management system may communicate with one or more external components. For example, the power management system may store information in a remote memory. The power management system may also contribute to a database of information about route, road conditions, and the like, such as a database of historical route information. In some variations, the motor control system may remotely communicate with a processor, so that at least some of the control logic is applied remotely.

Figure 11:
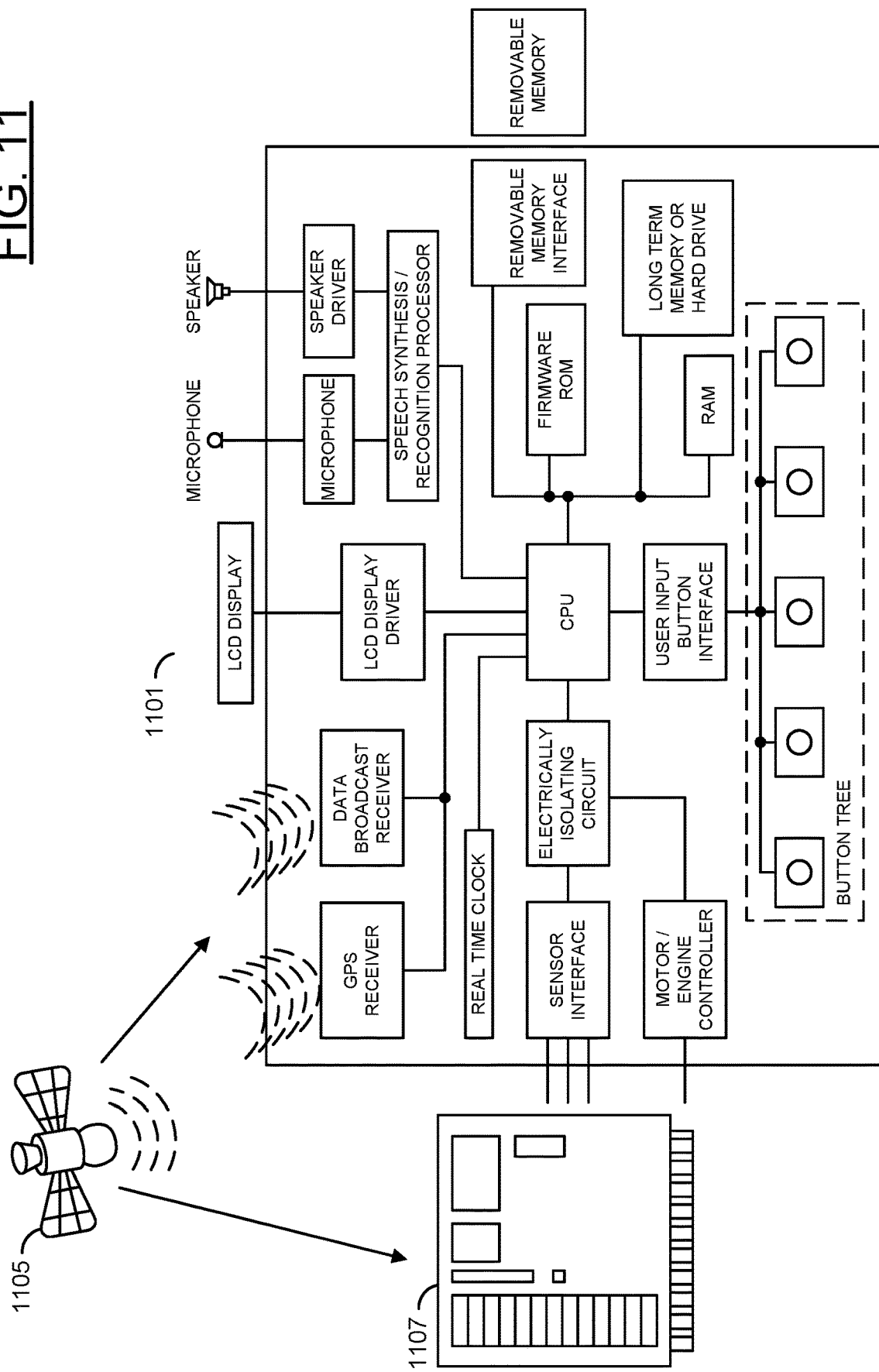
FIG. 11 illustrates a power management system remotely communicating with a server, as described herein.

FIG. 11 shows a schematic illustrating the use of telemetry by the motor control system. In FIG. 11, a power management device 1101 communicates by wireless communication with a database 1107 through a transmitter/receiver 1105 (shown as a satellite), Any reasonable type of wireless communications may be used, including cellular, wireless internee connections, radio, or the like. In this example, the database may both receive data from the power management device and/or transmit data or instructions to the power management device. Communication between the power management device and other components that are remotely located (e.g., memory, processor, information inputs) may also be used to update or correct the power management device. For example, the operational parameters of the vehicle may be revised or updated from a remote source. In some variations, control logic (e.g., power management control logic) may be remotely updated or revised.

The concepts described above may be used in various combinations to optimize the power used by a vehicle. Examples of power management systems, including methods of using them, are described below.

Examples

1. Fuel Efficient Hybrid Vehicle

Using one variation of the power management system described herein (e.g., a power management system having an integrated with a GPS), a hybrid car approaching a large hill or grade can adjust the ratio of electric to ICE such that the batteries would be empty at the crest of the hill and fully charged at the bottom of the hill, and therefore would use less gasoline.

The same methods described above could be used to calculate the energy usage of the vehicle as in the previous example. The mix of electric to ICE can be based on the calculated energy usage and the energy stored in the batteries. The exact mechanism for instructing the hybrid vehicle to alter its electric/ICE ratio may vary between manufacturers.

2. Fuel Efficient Internal Combustion Engine (ICE) Vehicle

Using one variation of the power management system described herein, an ICE car will speed up on a downhill when it knows that an uphill is the next terrain, and thereby use momentum to get up the hill, using less gasoline. FIG. 1B illustrates this Example. As described previously, the system may determine the optimum energy using external and internal sensors and information, including the operational parameters appropriate to the vehicle. Such operational parameters may vary from manufacturer to manufacturer (or vehicle to vehicle), and, as described above, could involve sending an electrical signal to a computer-based motor controller or even mechanically controlling the gas/air-flow r fixture to the engine.

3. Energy Efficient Solar-Powered Vehicle

Using one variation of the power management system described herein, a solar-powered car can ensure that it has adequate power to traverse a predetermined route. The power management system may ensure that there is enough solar energy power for the route by slowing and speeding the car as necessary based on current energy levels and anticipated energy needs.

This example is similar to the example discussed when determining the optimum speed above, with a couple of additional steps. In addition to calculating the energy usage, the system may also include a solar array model that could model the power generated by the solar array throughout the route base on the predicted weather, geographic location, and time of day. A battery model may also be included to keep track of the energy put into the batteries by the solar array, and the energy drawn from the batteries by the motor. When selecting the optimum speeds to drive the segments of the route, the system logic (e.g., software, hardware or both), may apply or access the battery model to prevent the battery from becoming completely drained.

4. Preventing Engine Flooding

One of the keys to efficient driving is not to step on the accelerator more than the engine can actually burn and use efficiently. Flooding the engine not only wastes gas but it doesn't maximize power, despite the drivers' demands.

According to one variation of the power management system described herein, a traditional ICE engine may be protected from flooding of the engine using the power management device.

In this variation of a power management device, power management device receives information inputs including a command input (acceleration), at least two environmental inputs (air resistance), the operational status of the vehicle (velocity and engine temperature), and at least one operational parameter (e.g., maximum fuel volume). For example, the power management device may receive information about the amount of pressure that the driver is applying to the accelerator. The power management system may also detect the current speed, resistance and temperature of the vehicle. This information input may be used to select the proper operational parameter of the vehicle. For example, the device may include a memory having a table of maximum fuel volumes for a given velocity, resistance and temperature. Thus, the velocity, resistance and temperature data may be used to look up a maximum fuel volume. In some variations, the maximum fuel volume may be calculate or estimated from this data. By comparing the operator demand (for acceleration) to supply fuel with the maximum amount of fuel that the engine can handle, the power management control logic may correct for the drivers inefficiency, and instruct the motor control mechanism to provide the actual maximum amount of fuel to the engine, thereby avoiding flooding of the engine.

This is a last example is a very simplified case of the overall actions of the power management control system. In general, the power management device intervenes between the driver and the engine. Thus, the power management device may interpret the driver commands so that the driving objective is achieved while maximizing the efficiency of the vehicle based on information that is not generally accessible or interpretable by the driver. While the invention has been described in terms of particular variations and illustrative figures, those of skill in the art will recognize that the invention is not limited to the variations or figures described.

For example, in one variation the system would be able to notify the driver the most fuel efficient speed for a route segment or segment destination. The notification might be via voice, written word, numbers, symbols, colors and/or the like. The vehicle operator can then manually adjust the vehicle speed based in response to the notification. In this example, the calculated power would not necessarily be directly applied to the vehicle engine as it would just be used as a driver alert.

In still another variation, the power consumption calculation could further include or be based on calculating an optimal acceleration to (gradually) accelerate to the determined efficient speed to travel the segment destination or optimal deceleration to (gradually) decelerate to the determined efficient speed to travel the segment destination. The calculation could for example incorporate GPS information, the determined efficient speed to travel the segment destination, or a combination thereof.

In still another variation, the information could be based on past history information of the vehicle, information of one or more other vehicles traveling one or more of the same route segments, or a combination thereof. For example, if one drives the same route to work each day, the energy consumption of those various trips can be stored along with the speeds driven along different segments of the route. From enough historical data, an optimized route could be determined.

In still another variation, the information could be stored information of vehicles traveling overlapping route segments. If many cars drive along overlapping segments, their energy usage for those segments could be uploaded to e.g. a centralized server where optimized speeds for those segments could be calculated. Those optimized speeds could be shared in several ways such as, but not limiting to, (i) transmitted directly to cars, where they could be used in fuel economy optimizing cruise control, (ii) transmitted to cars where they could used to provide recommendations to drivers, (iii) shared via a web site where drivers could view recommendations, (iv) shared via a web site where drivers could compare their fuel economy to that of other drivers. The data could be used by state or local governments to adjust speed limits to improve the overall fuel economy of the cars that drive along their roads.

In still another variation, an automatic transmission vehicle could use the determined efficient speed to intelligently shift gears, i.e., the optimized speed for (upcoming) route segments could be used by the automatic transmission to make intelligent decisions about shifting gears which would improve overall drive train efficiency.

In addition, where methods and steps described above indicate certain events occurring in certain order, those of skill in the art will recognize that the ordering of certain steps may be modified and that such modifications are in accordance with the variations of the invention. Additionally, certain steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Finally, all publications and patent applications cited in this specification are herein incorporated by reference in their entirety as if each individual publication or patent application were specifically and individually put forth herein.

The invention claimed is:

1. An apparatus comprising:
   a vehicle having a power source, a communication system, and a user interface system configured to receive input from one or more users traveling a vehicle route using the vehicle; and
   a power management system for the power source able to determine information about an external environment of the vehicle, with the power management system configured to:
      determine one or more future segments of the vehicle route, while the vehicle route is being traveled to by the vehicle, before the vehicle has reached the one or more future segments, wherein each of the one or more future segments comprises a determined length;
      before the vehicle has reached the one or more future segments, and without changing the vehicle route, redefine the one or more future segments as one or more alternative future segments in response to changes in the determined information about the external environment of the vehicle, wherein a total number of the one or more future segments is different from a total number of the one or more alternative future segments;
      use the determined information to determine one or more calculated powers over the one or more alternative future segments of the vehicle route; and
      calculate one or more speeds over the one or more alternative future segments of the vehicle route and act to apply the one or more calculated powers to the vehicle to travel along the one or more alternative future segments of the vehicle route at the one or more calculated speeds.

2. The apparatus of claim 1, wherein the vehicle route is set based on a future destination determined by the power management system based at least in part using historical data associated with the one or more users, wherein the future destination is a destination at which the vehicle will be parked and turned off.

3. The vehicle of claim 1, wherein the vehicle route is set based on a future destination determined by the power management system at least in part using statistical destination logic.

4. The apparatus of claim 1, wherein determining information about the external environment of the vehicle further comprises communicating with a remote database, and wherein the information about the external environment is selected from the group consisting of: an elevation of the vehicle, upcoming elevations of the vehicle, a current grade of the vehicle route, a predicted grade of an upcoming segment of the vehicle route, traffic information, a location of a stoplight, a timing of a stoplight, a present angle of the sun, a predicted angle of the sun for an upcoming segment of the vehicle route, a present wind direction, a predicted wind direction for an upcoming segment of the vehicle route, a present wind velocity, a predicted wind velocity for an upcoming segment of the vehicle route, a current temperature, a predicted temperature for an upcoming segment of the vehicle route, a current air pressure, a predicted air pressure for an upcoming segment of the vehicle route, a time of day, a date, a day of a week, and a visibility.

5. The apparatus of claim 1, wherein the one or more calculated speeds are based at least in part on one or more determined probable optimal speeds using historical route information, and wherein the one or more determined probable optimal speeds are configured for maximum energy efficiency, within one or more constraints, of the vehicle on the vehicle route.

6. The apparatus of claim 1, wherein the one or more calculated speeds are based at least in part on iteratively simulated speeds.

7. The method of claim 2, wherein a last of the one or more alternative future segments includes the future destination.

8. The vehicle of claim 1, further comprising, before the vehicle has reached any of the one or more future segments, adjusting one or more of the determined lengths of the one or more future segments in response to changes in the determined information about the external environment of the vehicle.

9. The vehicle of claim 2, wherein the future destination is not explicitly provided by the one or more users.

* * * * *